United States Patent
Zhang et al.

(10) Patent No.: US 12,082,289 B2
(45) Date of Patent: Sep. 3, 2024

(54) COMMUNICATION METHOD, APPARATUS, AND SYSTEM

(71) Applicant: HUAWEI TECHNOLOGIES CO., LTD., Shenzhen (CN)

(72) Inventors: Hongping Zhang, Shanghai (CN); Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 525 days.

(21) Appl. No.: 17/351,324

(22) Filed: Jun. 18, 2021

(65) Prior Publication Data
US 2021/0315044 A1 Oct. 7, 2021

Related U.S. Application Data

(63) Continuation of application No. PCT/CN2019/125728, filed on Dec. 16, 2019.

(30) Foreign Application Priority Data

Dec. 20, 2018 (CN) .......................... 201811562867.0

(51) Int. Cl.
*H04W 76/27* (2018.01)
*H04W 12/02* (2009.01)
*H04W 24/02* (2009.01)

(52) U.S. Cl.
CPC ........... *H04W 76/27* (2018.02); *H04W 12/02* (2013.01); *H04W 24/02* (2013.01)

(58) Field of Classification Search
CPC ...... H04W 12/02; H04W 24/02; H04W 76/27
See application file for complete search history.

(56) References Cited

U.S. PATENT DOCUMENTS 9,247,014 B1 * 1/2016 Rao .................... G06F 16/9038
9,949,125 B2 * 4/2018 Hahn .................... H04W 12/04
(Continued)

FOREIGN PATENT DOCUMENTS

CN 101053221 A 10/2007
CN 103491643 A 1/2014
(Continued)

OTHER PUBLICATIONS

"3rd Generation Partnership Project; Technical Specification Group Services and System Aspects; Telecommunication management; Subscriber and equipment trace; Trace control and configuration management (Release 15)",3GPP Standard; Technical Specification; 3GPP TS 32.422,vol. SA WG5, No. V15.1.0, Jun. 21, 2018 (Jun. 21, 2018), pp. 1-189, XP051473057.
(Continued)

*Primary Examiner* — Alpus Hsu
(74) *Attorney, Agent, or Firm* — Rimon PC

(57) ABSTRACT

This application provides a communication method and apparatus, and a system, to protect security and user privacy in a data transmission process. After determining to establish a radio resource control (RRC) connection in anonymous mode, a terminal device sends a request to an access network device, to request to establish the RRC connection in anonymous mode, so that the access network device establishes the RRC connection in anonymous mode to the terminal device. The solutions in this application may be applied to a communications system, for example, may be applied to a 5th generation 5G network.

20 Claims, 6 Drawing Sheets

(56) References Cited

U.S. PATENT DOCUMENTS

| | | | |
|---|---|---|---|
| 10,271,224 B2* | 4/2019 | Dimou | H04W 74/0833 |
| 10,306,684 B2* | 5/2019 | Jung | H04W 76/10 |
| 10,368,381 B2* | 7/2019 | Hahn | H04W 76/14 |
| 10,609,608 B2* | 3/2020 | Park | H04W 76/19 |
| 10,616,942 B2* | 4/2020 | Yu | H04W 8/02 |
| 10,728,811 B2* | 7/2020 | Kim | H04W 68/02 |
| 10,779,349 B2* | 9/2020 | Kim | H04W 4/02 |
| 2008/0056198 A1 | 3/2008 | Charpentier et al. | |
| 2012/0157124 A1 | 6/2012 | Kim et al. | |
| 2013/0178211 A1 | 7/2013 | Wang et al. | |
| 2019/0059052 A1* | 2/2019 | Nord | H04W 52/0258 |
| 2019/0104455 A1* | 4/2019 | Park | H04W 76/20 |
| 2020/0245242 A1* | 7/2020 | Höglund | H04W 52/0216 |
| 2021/0212131 A1* | 7/2021 | Futaki | H04W 76/10 |

FOREIGN PATENT DOCUMENTS

| | | |
|---|---|---|
| CN | 103747522 A | 4/2014 |
| CN | 102421136 B | 5/2014 |
| CN | 103037349 B | 7/2017 |
| CN | 107124741 A | 9/2017 |
| EP | 1641302 A1 | 3/2006 |
| WO | 2014023817 A1 | 2/2014 |

OTHER PUBLICATIONS

3GPP TSG SA WG5 (Telecom Management) Meeting #99,S5-151132, Changes related to MBSFN MDT in 32.422, Alcatel-Lucent,Feb. 2-6, 2015 Taipei, Taiwan,total 119 pages.

3GPP TS 25.331 V6.21.0 (Apr. 1, 2009), 3rd Generation Partnership Project; Universal Mobile Telecommunications System (UMTS); Radio Resource Control (RRC); Protocol Specification (Release 6), ETSI TS 125 331, 1256 pages.

Ericsson, Implications of user consent on MDT use cases. 3GPP TSG SA WG5 (Telecom Management) Meeting #85, Oct. 8, 2012; Kyoto, Japan, S5-122316, 3 pages.

3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/125728, filed on Dec. 16, 2019, which claims priority to Chinese Patent Application No. 201811562867.0, filed on Dec. 20, 2018. The disclosures of the aforementioned applications are hereby incorporated by reference in their entireties.

TECHNICAL FIELD

This application relates to the field of communications technologies, and in particular, to a communication method and apparatus, and a system that can support a connection in anonymous mode.

BACKGROUND

To reduce data collection costs, a minimization of drive tests (MDT) technology for automatic measurement collection is introduced in a current technology to complete some conventional drive tests, to detect and optimize a problem or a fault in a wireless network. An application scenario of the MDT technology may include: An operator generally performs a routine network coverage drive test every month, or performs some network coverage drive tests for a specific area in response to a user complaint.

Currently, implementation of the MDT technology depends on reporting by a terminal device. According to the conventional technology, the terminal device can report MDT data to a base station only after the terminal device is authenticated and authorized by a core network. To be specific, the terminal device first establishes a radio resource control (RRC) connection on an air interface, and can send the MDT data to the base station only after the terminal device is authenticated or authorized by the core network and air interface security is successfully activated.

However, the MDT data carries location information, which involves security and user privacy issues and may have admission risks. Therefore, how to protect security and user privacy in an MDT data transmission process is an urgent problem to be resolved currently.

SUMMARY

Communication methods provided in embodiments of this application may be used to protect security and user privacy in a data transmission process.

To achieve the foregoing objective, the following technical solutions are used in the embodiments of this application.

According to a first aspect, a communication method and a corresponding communications apparatus are provided. In this solution, an access network device receives a first message from a terminal device, where the first message is used to indicate the terminal device to request to establish a radio resource control RRC connection in anonymous mode. The access network device acquires, based on the first message, that the terminal device requests to establish the RRC connection in anonymous mode. The access network device determines to establish the RRC connection in anonymous mode to the terminal device. Considering that user privacy includes two elements, namely, a subject and an object of the user privacy, the subject is generally represented by identity information of the terminal device, and the object is private information. In the embodiments of this application, privacy issues of anonymous data are resolved from a perspective of the subject. Based on this solution, because the RRC connection in anonymous mode may be established between the access network device and the terminal device, the anonymous data can be transmitted, so that security and the user privacy in a data transmission process can be protected. In a possible implementation, the anonymous data may include, for example, minimization of drive tests MDT data, so that security and user privacy issues in an MDT data transmission process can be alleviated.

In a possible design, that the access network device determines to establish the RRC connection in anonymous mode to the terminal device includes: The access network device skips performing a step of establishing a connection for the terminal device to a core network device. Alternatively, the access network device establishes a connection for the terminal device to a core network device, but the terminal device does not send, to the core network device, identity information by using which the terminal device can be directly or indirectly identified, for example, an international mobile subscriber identity (IMSI), a subscription permanent identifier (SUPI), an S-temporary mobile subscriber identity (S-TMSI), or a fifth generation (5G) S-TMSI.

It should be noted that, in this embodiment of this application, that the access network device skips performing a step of establishing a connection for the terminal device to a core network device may mean that in anonymous mode, the connection between the access network device and the terminal device is established without involving the core network device; or the access network device skips the step of establishing the connection for the terminal device to the core network device; or the access network device ignores the step of establishing the connection for the terminal device to the core network device; or the access network device does not initiate the step of establishing the connection for the terminal device to the core network device, or the like. This is not specifically limited in this embodiment of this application.

Optionally, the connection between the access network device and the core network device for the terminal device may be, for example, an N2 connection or a next-generation (NG) connection for the terminal device in a new radio (NR) system. Alternatively, the connection between the access network device and the core network device for the terminal device may be, for example, an SI connection for the terminal device in a long term evolution LTE system. Optionally, in this embodiment of this application, the step of establishing the connection for the terminal device to the core network device may include: For example, a base station sends an initial user equipment (UE) message to the core network device, so that the core network device performs authentication or authorization on the terminal device after receiving the initial UE message from the base station. Further, the core network device sends an initial context setup request to the base station, and the base station returns an initial context setup response to the core network device. For details, refer to an existing implementation. Details are not described herein again.

In a possible design, the first message carries first indication information, where the first indication information is used to indicate the terminal device to request to establish the RRC connection in anonymous mode. In other words, in this embodiment of this application, explicit indication information may be used to indicate the terminal device to request to establish the RRC connection in anonymous mode.

In a possible design, the first message is an RRC setup complete message. That the access network device acquires, based on the first message, that the terminal device requests to establish the RRC connection in anonymous mode includes: The access network device determines that the RRC setup complete message does not carry a non-access stratum (NAS) protocol data unit (PDU) information element or that the RRC setup complete message carries a NAS PDU information element whose length is 0. The access network device acquires that the terminal device requests to establish the RRC connection in anonymous mode. In other words, in this embodiment of this application, the access network device may determine, based on whether the RRC setup complete message carries the NAS PDU information element or whether the RRC setup complete message carries the NAS PDU information element whose length is 0, whether the terminal device requests to establish the RRC connection in anonymous mode. If the access network device determines that the RRC setup complete message does not carry the NAS PDU information element or that the RRC setup complete message carries the NAS PDU information element whose length is 0), the access network device acquires that the terminal device requests to establish the RRC connection in anonymous mode.

In a possible design, that the access network device receives the first message from the terminal device includes: The access network device receives, on a first random access resource, the first message from the terminal device, where the first random access resource is a dedicated resource used for random access for the RRC connection that the terminal device requests to establish in anonymous mode. That the access network device acquires, based on the first message, that the terminal device requests to establish the RRC connection in anonymous mode includes: The access network device acquires, based on the first random access resource, that the terminal device requests to establish the RRC connection in anonymous mode. In other words, in this embodiment of this application, the dedicated resource used for the random access for the RRC connection that the terminal device requests to establish in anonymous mode may be used to carry the first message. After receiving the first message, the access network device may acquire, based on the first random access resource, that the terminal device requests to establish the RRC connection in anonymous mode. The first random access resource may include, for example, any combination of a first random access preamble, a first random access time domain resource, and a first random access frequency domain resource.

Optionally, before the access network device receives the first message from the terminal device, the method further includes: The access network device sends second indication information, where the second indication information is used to indicate configuration information of the dedicated resource used for the random access for the RRC connection that the terminal device requests to establish in anonymous mode, and the configuration information includes configuration information of the first random access resource.

Certainly, in this embodiment of this application, the access network device and the terminal device may pre-negotiate the configuration information of the dedicated resource used for the random access for the RRC connection that the terminal device requests to establish in anonymous mode, or preconfigure or pre-agree on the configuration information of the dedicated resource used for the random access for the RRC connection that the terminal device requests to establish in anonymous mode. This is not specifically limited in this embodiment of this application.

In a possible design, after the access network device acquires that the terminal device requests to establish the RRC connection in anonymous mode, the method further includes: The access network device receives a second message from the terminal device, where the second message carries anonymous data. In other words, in this embodiment of this application, the anonymous data may be transmitted via a control plane. A data bearer (DRB) does not need to be establish. Therefore, compared with a mode of transmitting the anonymous data via a user plane, transmitting the anonymous data via the control plane is simpler.

Optionally, the second message further carries third indication information, where the third indication information is used to indicate that data transmission is completed or that the anonymous data is the last packet of anonymous data. The method further includes: The access network device releases the RRC connection corresponding to the terminal device based on the third indication information. Based on this solution, after anonymous data transmission is completed, the access network device may release the RRC connection corresponding to the terminal device in time. Therefore, power consumption of the terminal device can be reduced.

In a possible design, after the access network device acquires that the terminal device requests to establish the RRC connection in anonymous mode, the method further includes: The access network device sends a third message to the terminal device, where the third message is used to indicate to establish a data bearer DRB. The access network device receives, from the DRB, anonymous data from the terminal device. In other words, in this embodiment of this application, the anonymous data may be transmitted via a user plane. The anonymous data does not need to be obtained by decoding an RRC message. Therefore, compared with the mode of transmitting the anonymous data via the control plane, the mode of transmitting the anonymous data via the user plane reduces processing resource overheads of the access network device.

Optionally, the method further includes: The access network device receives, from the DRB, fourth indication information from the terminal device, where the fourth indication information is used to indicate that data transmission is completed or that the anonymous data is the last packet of anonymous data. The access network device releases the RRC connection corresponding to the terminal device based on the fourth indication information. Based on this solution, after anonymous data transmission is completed, the access network device may release the RRC connection corresponding to the terminal device in time. Therefore, power consumption of the terminal device can be reduced.

Optionally, the method further includes: The access network device receives a fourth message from the terminal device, where the fourth message is used to indicate that data transmission is completed or that the anonymous data is the last packet of anonymous data, or that the fourth message is used to request to release the RRC connection corresponding to the terminal device. The access network device releases the RRC connection corresponding to the terminal device based on the fourth message. Based on this solution, after anonymous data transmission is completed, the access network device may release the RRC connection corresponding to the terminal device in time. Therefore, power consumption of the terminal device can be reduced.

In a possible design, before the access network device acquires that the terminal device requests to establish the RRC connection in anonymous mode, the method further includes: The access network device sends fifth indication information, where the fifth indication information is used to indicate that a serving cell of the terminal device supports anonymous data transmission, or the fifth indication information is used to indicate that a serving cell of the terminal device supports establishment of the RRC connection in anonymous mode. Based on this solution, the terminal device may acquire that the serving cell of the terminal device supports the anonymous data transmission, or that the serving cell of the terminal device supports the establishment of the RRC connection in anonymous mode. In this way, when the terminal device needs to transmit the anonymous data, the terminal device may determine, based on the fifth indication information, to establish the RRC connection in anonymous mode.

According to a second aspect, a communication method and a corresponding communications apparatus are provided. In this solution, a terminal device determines to establish a radio resource control RRC connection in anonymous mode. The terminal device sends a first message to an access network device, where the first message is used to indicate the terminal device to request to establish the RRC connection in anonymous mode. Considering that user privacy includes two elements, namely, a subject and an object of the user privacy, the subject is generally represented by identity information of the terminal device, and the object is private information. If the private information lacks a subject, there is no more privacy issues. The private information may include, for example, location information. The location information is crucial to network optimization. For example, if there is no location information, an MDT effect will be greatly affected. Because the location information is significant, in this embodiment of this application, privacy issues of anonymous data are resolved from a perspective of the subject. Based on this solution, because the RRC connection in anonymous mode may be established between the access network device and the terminal device, the anonymous data can be transmitted, so that security and the user privacy in a data transmission process can be protected. In a possible implementation, the anonymous data may include, for example, minimization of drive tests MDT data, so that security and user privacy issues in an MDT data transmission process can be alleviated.

In a possible design, the first message carries first indication information, where the first indication information is used to indicate the terminal device to request to establish the RRC connection in anonymous mode. In other words, in this embodiment of this application, explicit indication information may be used to indicate the terminal device to request to establish the RRC connection in anonymous mode.

In a possible design, the first message is an RRC setup complete message. The RRC setup complete message does not carry a NAS PDU information element, or the RRC setup complete message carries a NAS PDU information element whose length is 0). In other words, in this embodiment of this application, the access network device may determine, based on whether the RRC setup complete message carries the NAS PDU information element or whether the RRC setup complete message carries the NAS PDU information element whose length is 0, whether the terminal device requests to establish the RRC connection in anonymous mode. If the access network device determines that the RRC setup complete message does not carry the NAS PDU information element or that the RRC setup complete message carries the NAS PDU information element whose length is 0), the access network device acquires that the terminal device requests to establish the RRC connection in anonymous mode.

In a possible design, that the terminal device sends the first message to the access network device includes: The terminal device sends, on a first random access resource, the first message to the access network device, where the first random access resource is a dedicated resource used for random access for the RRC connection that the terminal device requests to establish in anonymous mode. In other words, in this embodiment of this application, the dedicated resource used for the random access for the RRC connection that the terminal device requests to establish in anonymous mode may be used to carry the first message. After receiving the first message, the access network device may acquire, based on the first random access resource, that the terminal device requests to establish the RRC connection in anonymous mode. The first random access resource may include, for example, any combination of a first random access preamble, a first random access time domain resource, and a first random access frequency domain resource.

Optionally, before the terminal device sends the first message to the access network device, the method further includes: The terminal device receives second indication information from the access network device, where the second indication information is used to indicate configuration information of the dedicated resource used for the random access for the RRC connection that the terminal device requests to establish in anonymous mode, and the configuration information includes configuration information of the first random access resource.

Certainly, in this embodiment of this application, the access network device and the terminal device may pre-negotiate the configuration information of the dedicated resource used for the random access for the RRC connection that the terminal device requests to establish in anonymous mode, or preconfigure or pre-agree on the configuration information of the dedicated resource used for the random access for the RRC connection that the terminal device requests to establish in anonymous mode. This is not specifically limited in this embodiment of this application.

In a possible design, after the terminal device sends the first message to the access network device, the method further includes: The terminal device sends a second message to the access network device, where the second message carries anonymous data. In other words, in this embodiment of this application, the anonymous data may be transmitted via a control plane. A data bearer DRB does not need to be establish. Therefore, compared with a mode of transmitting the anonymous data via a user plane, transmitting the anonymous data via the control plane is simpler.

Optionally, the second message further carries third indication information, where the third indication information is used to indicate that data transmission is completed or that the last anonymous data packet is currently transmitted. Based on this solution, the access network device may acquire that anonymous data transmission is completed, so that the access network device may release the RRC connection corresponding to the terminal device in time. Therefore, power consumption of the terminal device can be reduced.

In a possible design, after the terminal device sends the first message to the access network device, the method further includes: The terminal device receives a third message from the access network device, where the third message is used to indicate to establish a data bearer DRB. The terminal device establishes the DRB based on the third message. The terminal device sends, on the DRB, anonymous data to the access network device. In other words, in this embodiment of this application, the anonymous data may be transmitted via a user plane. The anonymous data does not need to be obtained by decoding an RRC message. Therefore, compared with the mode of transmitting the anonymous data via the control plane, the mode of transmitting the anonymous data via the user plane reduces processing resource overheads of the access network device.

Optionally, the method further includes: The terminal device sends, on the DRB, fourth indication information to the access network device, where the fourth indication information is used to indicate that data transmission is completed or that the anonymous data is the last packet of anonymous data. Based on this solution, the access network device may acquire that anonymous data transmission is completed, so that the access network device may release the RRC connection corresponding to the terminal device in time. Therefore, power consumption of the terminal device can be reduced.

Optionally, the method further includes: The terminal device sends a fourth message to the access network device, where the fourth message is used to indicate that data transmission is completed or that the anonymous data is the last packet of anonymous data, or that the fourth message is used to request to release the RRC connection corresponding to the terminal device. Based on this solution, the access network device may acquire that anonymous data transmission is completed, so that the access network device may release the RRC connection corresponding to the terminal device in time. Therefore, power consumption of the terminal device can be reduced.

In a possible design, the method further includes: The terminal device receives fifth indication information from the access network device, where the fifth indication information is used to indicate that a serving cell of the terminal device supports anonymous data transmission, or the fifth indication information is used to indicate that a serving cell of the terminal device supports establishment of the RRC connection in anonymous mode. That the terminal device requests to establish the RRC connection in anonymous mode includes: The terminal device determines, based on the fifth indication information, to establish the RRC connection in anonymous mode. Based on this solution, the terminal device may acquire that the serving cell of the terminal device supports the anonymous data transmission, or that the serving cell of the terminal device supports the establishment of the RRC connection in anonymous mode. In this way, when the terminal device needs to transmit the anonymous data, the terminal device may determine, based on the fifth indication information, to establish the RRC connection in anonymous mode.

With reference to the first aspect or the second aspect, in a possible design, that the second indication information is used to indicate configuration information of the dedicated resource used for the random access for the RRC connection that the terminal device requests to establish in anonymous mode may mean that the second indication information includes the configuration information of the dedicated resource used for the random access for the RRC connection that the terminal device requests to establish in anonymous mode, or may mean that the second indication information includes an identifier (or an index) of the configuration information of the dedicated resource used for the random access for the RRC connection that the terminal device requests to establish in anonymous mode. Further, the terminal device may determine the configuration information of the dedicated resource based on the identifier (or the index) or the like of the configuration information of the dedicated resource and a correspondence between the configuration information of the dedicated resource and the identifier (or the index) of the configuration information of the dedicated resource. This is not specifically limited in this embodiment of this application.

With reference to the first aspect or the second aspect, in a possible design, the configuration information of the dedicated resource is any combination of random access preamble sequence information, random access time domain resource information, and random access frequency domain resource information.

For example, the configuration information of the dedicated resource may include the random access preamble information. Alternatively, the configuration information of the dedicated resource may include the random access time domain resource information. Alternatively, the configuration information of the dedicated resource may include the random access frequency domain resource information. Alternatively, the configuration information of the dedicated resource may include random access preamble information on a random access frequency domain resource, in other words, the configuration information of the dedicated resource includes the random access frequency domain resource information and the random access preamble information. Alternatively, the configuration information of the dedicated resource may include random access preamble information on a random access time domain resource, in other words, the configuration information of the dedicated resource includes the random access time domain resource information and the random access preamble information. Alternatively, the configuration information of the dedicated resource may include a random access frequency domain resource and a random access preamble on the random access time domain resource, in other words, the configuration information of the dedicated resource includes the random access time domain resource information, the random access frequency resource information, and the random access preamble information.

With reference to the first aspect or the second aspect, in a possible design, establishing an RRC connection in anonymous mode may also be described as transmitting data in anonymous mode, or may be described as transmitting anonymous data, or when anonymous data includes MDT data, establishing an RRC connection in anonymous mode may also be described as transmitting the MDT data, or the like. This is uniformly described herein and is not specifically limited in this embodiment of this application.

With reference to the first aspect or the second aspect, in a possible design, in a scenario in which the first message carries the first indication information, the first message may be an RRC setup request message or an RRC setup complete message.

Optionally, the RRC setup request message further carries a random value, where the random value is used by the terminal device to perform contention resolution for random access. In other words, because in this embodiment of this application anonymous data transmission needs to be implemented, in this embodiment of this application, regardless of whether the core network device allocates a terminal identifier, for example, an S-TMSI or a 5G S-TMSI, to the terminal device, the RRC setup request message carries neither a terminal identifier of a non-access stratum nor a part of fields of the terminal identifier, but carries a value generated or determined by the terminal device, for example, a random value. The random value is used by the terminal device to perform contention resolution for random access. For example, after obtaining the random value, the access network device may return the random value in a response message (for example, a contention conflict resolution message) for the RRC setup request message. Further, the terminal device determines, based on whether the random value returned by the access network device is the value sent by the terminal device, whether the terminal device succeeds in contention. If the random value returned by the access network device is the value sent by the terminal device, it is considered that the terminal device succeeds in contention. Otherwise, it is considered that the terminal device fails in contention.

Optionally, the RRC setup complete message does not carry information about registration of the terminal device with the core network, or the RRC setup complete message does not carry a non-access stratum NAS protocol data unit PDU information element, or the RRC setup complete message carries a NAS PDU information element whose length is 0). In other words, in this embodiment of this application, because anonymous data transmission is expected to be implemented, in this embodiment of this application, regardless of whether the terminal device is registered with the core network, the RRC setup complete message does not carry the information about registration of the terminal device with the core network, or the RRC setup complete message does not carry the non-access stratum NAS protocol data unit PDU information element, or the RRC setup complete message carries the NAS PDU information element whose length is 0. The NAS PDU information element is signaling for interaction between the access network device and the core network device. In this way, not only signaling overheads can be reduced, but also user information can be better hidden.

With reference to the first aspect or the second aspect, in a possible design, the first message is a dedicated message used to indicate the terminal device to request to establish the RRC connection in anonymous mode. Based on this solution, after receiving the dedicated message, the access network device may acquire, based on the dedicated message, that the terminal device requests to establish the RRC connection in anonymous mode.

According to a third aspect, a communications apparatus is provided, to implement the foregoing methods. The communications apparatus may be the access network device in the first aspect, or an apparatus including the access network device. Alternatively, the communications apparatus may be the terminal device in the second aspect, or an apparatus including the terminal device. The communications apparatus includes a corresponding module, unit, or means for implementing the foregoing methods. The module, unit, or means may be implemented by hardware or software, or implemented by hardware executing corresponding software. The hardware or the software includes one or more modules or units corresponding to the foregoing functions.

According to a fourth aspect, a communications apparatus is provided. The communications apparatus includes a processor and a memory. The memory is configured to store computer instructions. When the processor executes the instructions, the communications apparatus is enabled to perform the method according to any one of the foregoing aspects. The communications apparatus may be the access network device in the first aspect or an apparatus including the access network device. Alternatively, the communications apparatus may be the terminal device in the second aspect, or an apparatus including the terminal device.

According to a fifth aspect, a communications apparatus is provided. The communications apparatus includes a processor. The processor is configured to: be coupled to a memory, and after reading instructions in the memory, perform the method according to any one of the foregoing aspects based on the instructions. The communications apparatus may be the access network device in the first aspect or an apparatus including the access network device. Alternatively, the communications apparatus may be the terminal device in the second aspect, or an apparatus including the terminal device.

According to a sixth aspect, a computer-readable storage medium is provided. The computer-readable storage medium stores instructions. When the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

According to an eighth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store program instructions and data that are necessary. When the communications apparatus is a chip system, the communications apparatus may include a chip, or may include a chip and another discrete component.

For technical effects brought by any design manner in the third aspect to the eighth aspect, refer to the technical effects brought by different design manners in the first aspect or the second aspect. Details are not described herein again.

According to a ninth aspect, a communications system is provided. The communications system includes the terminal device in the foregoing aspects and the access network device in the foregoing aspects.

DESCRIPTION OF EMBODIMENTS

The following describes technical solutions in embodiments of this application with reference to accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one of the following items (pieces)" or a similar expression thereof means any combination of the items, including any combination of one item (piece) or a plurality of items (pieces). For example, at least one of a, b, or c may indicate: a, b, c, a and b, a and c, b and c, or a, b, and c, where a, b, and c may be singular or plural. In addition, for ease of clearly describing the technical solutions in the embodiments of this application, in the embodiments of this application, words such as "first" and "second" are used to distinguish between same items or similar items whose functions and functions are basically the same. A person skilled in the art may understand that words such as "first" and "second" do not limit a quantity and an execution order, and the words such as "first" and "second" do not limit an absolute difference.

In addition, a network architecture and a service scenario that are described in embodiments of this application are intended to describe the technical solutions in the embodiments of this application more clearly, and do not constitute a limitation on the technical solutions provided in the embodiments of this application. A person of ordinary skill in the art may acquire that with evolution of the network architecture and emergence of a new service scenario, the technical solutions provided in the embodiments of this application are also applicable to similar technical problems.

Figure 1:
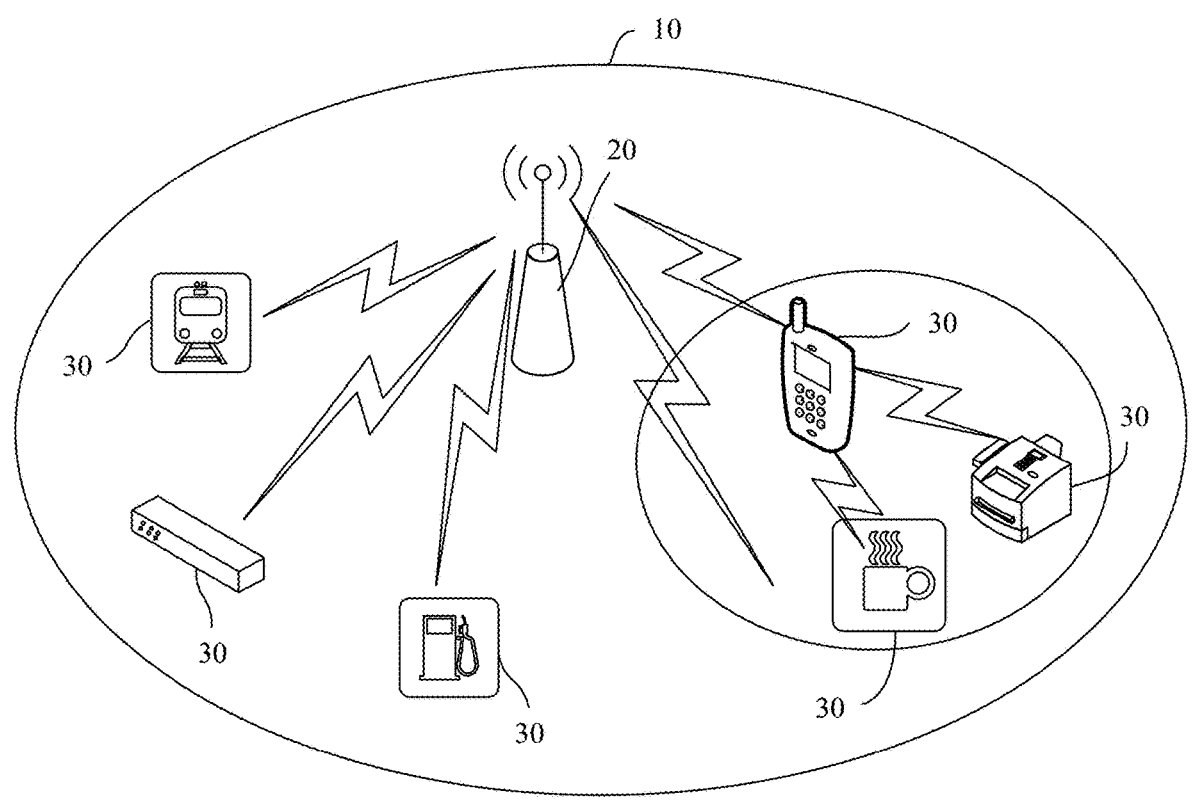
FIG. 1 is a schematic structural diagram of a communications system according to an embodiment of this application.

FIG. 1 shows a communications system 10 according to an embodiment of this application. The communications system 10 includes one access network device 20 and one or more terminal devices 30 connected to the access network device 20.

An example in which the access network device 20 shown in FIG. 1 interacts with any terminal device 30 is used. In this embodiment of this application, after determining to establish a radio resource control (RRC) connection in anonymous mode, the terminal device 30 sends a first message to the access network device 20. The first message is used to indicate the terminal device 30 to request to establish the RRC connection in anonymous mode. After receiving the first message from the terminal device 30, the access network device 20 acquires that the terminal device 30 requests to establish the RRC connection in anonymous mode, and the access network device 20 may further determine to establish the RRC connection in anonymous mode to the terminal device 30. For example, the access network device 20 skips performing a step of establishing a connection for the terminal device 30 to a core network device. Alternatively, the access network device 20 establishes a connection for the terminal device 30 to a core network device, but the terminal device does not send, to the core network device, identity information by using which the terminal device can be directly or indirectly identified, for example, an international mobile subscriber identity (IMSI), a subscription permanent identifier (SUPI), an s-temporary mobile subscriber identity (S-TMSI), or a 5G-TMSI.

It should be noted that, in this embodiment of this application, that the access network device 20 skips performing a step of establishing a connection for the terminal device 30 to a core network device may mean that in anonymous mode, the connection between the access network device 20 and the terminal device 30 is established without involving the core network device; or the access network device 20 skips the step of establishing the connection for the terminal device 30 to the core network device; or the access network device 20 ignores the step of establishing the connection for the terminal device 30 to the core network device; or the access network device 20 does not initiate the step of establishing the connection for the terminal device 30 to the core network device, or the like. This is not specifically limited in this embodiment of this application.

In this embodiment of this application, establishing an RRC connection in anonymous mode may also be described as transmitting data in anonymous mode, or may be described as transmitting anonymous data, or when anonymous data includes MDT data, establishing an RRC connection in anonymous mode may also be described as transmitting the MDT data, or the like. This is uniformly described herein and is not specifically limited in this embodiment of this application.

Considering that user privacy includes two elements, namely, a subject and an object of the user privacy, the subject is generally represented by identity information of the terminal device, and the object is private information. If the private information lacks a subject, there is no more privacy issues. The private information may include, for example, location information. The location information is crucial to network optimization. For example, if there is no location information, an MDT effect will be greatly affected. Because the location information is significant, in this embodiment of this application, privacy issues of anonymous data are resolved from a perspective of the subject. Based on the communications system provided in this embodiment of this application, because the RRC connection in anonymous mode may be established between the access network device and the terminal device, the anonymous data can be transmitted, so that security and the user privacy in a data transmission process can be protected. In a possible implementation, the anonymous data may include, for example, the MDT data, so that security and user privacy issues in an MDT data transmission process can be alleviated.

Figure 2:
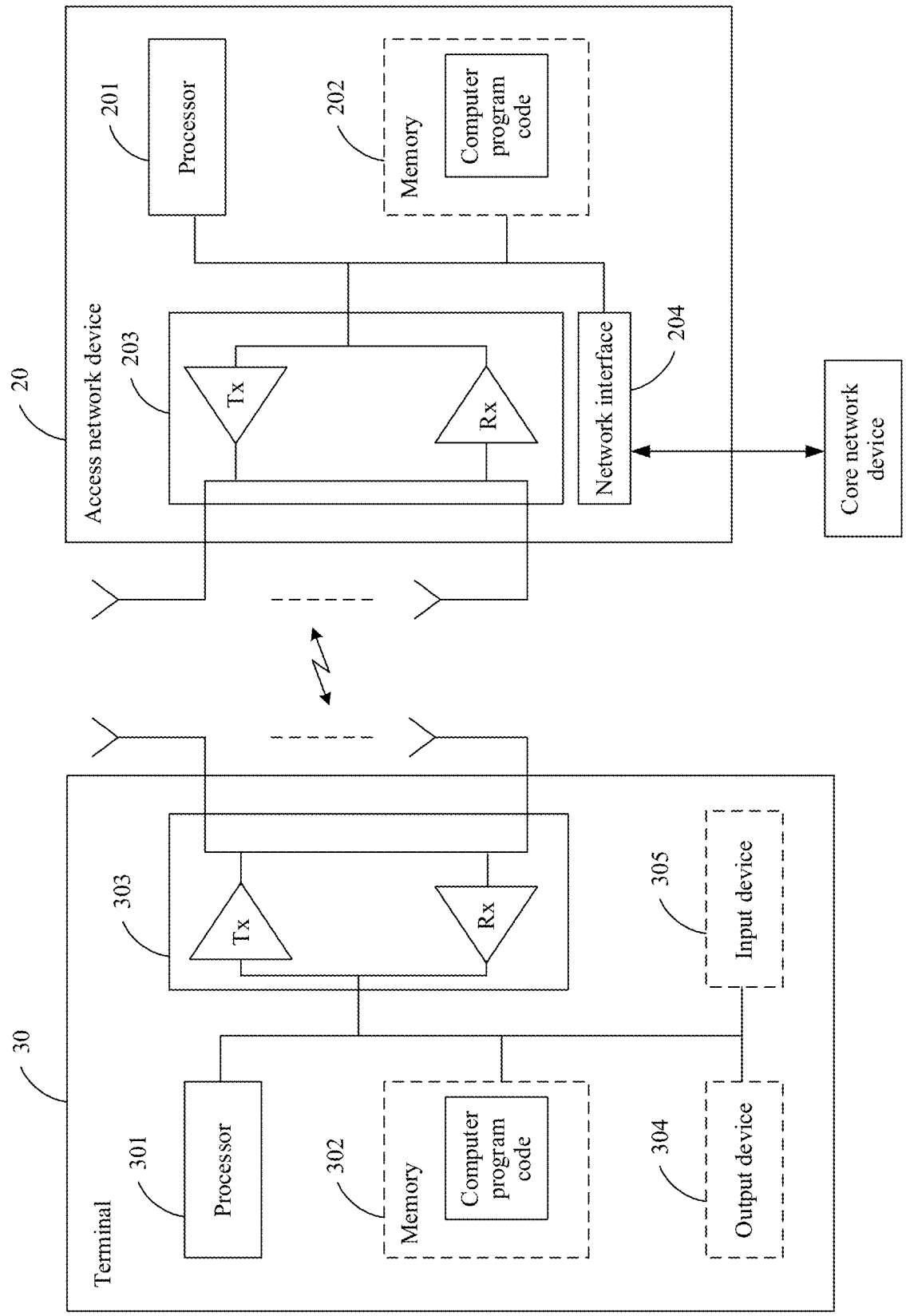
FIG. 2 is a schematic structural diagram of an access network device and a terminal device according to an embodiment of this application.

Optionally, FIG. 2 is a schematic diagram of a hardware structure of an access network device 20 and a terminal device 30 according to an embodiment of this application.

The terminal device 30 includes at least one processor (an example in which the terminal device 30 includes one processor 301 is used for description in FIG. 2) and at least one transceiver (an example in which the terminal device 30 includes one transceiver 303 is used for description in FIG. 2). Optionally, the terminal device 30 may further include at least one memory (an example in which the terminal device 30 includes one memory 302 is used for description in FIG. 2), at least one output device (an example in which the terminal device 30 includes one output device 304 is used for description in FIG. 2), and at least one input device (an example in which the terminal device 30 includes one input device 305 is used for description in FIG. 2).

The processor 301, the memory 302, and the transceiver 303 are connected through a communications line. The communications line may include a path transmitting information between the foregoing components.

The processor 301 may be a general-purpose central processing unit (CPU), a microprocessor, an application-specific integrated circuit (ASIC), or one or more integrated circuits configured to control program execution of the solutions in this application. In a specific implementation, in an embodiment, the processor 301 may also include a plurality of CPUs, and the processor 301 may be a single-core processor (single-CPU) or a multi-core processor (multi-CPU). The processor herein may refer to one or more devices, circuits, and/or processing cores configured to process data (for example, computer program instructions).

The memory 302 may be an apparatus having a storage function. For example, the memory 302 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory 302 may exist independently, and is connected to the processor 301 through the communications line. The memory 302 may alternatively be integrated with the processor 301.

The memory 302 is configured to store computer-executable instructions for executing the solutions of this application, and the processor 301 controls the execution. Specifically, the processor 301 is configured to execute the computer-executable instructions stored in the memory 302, to implement the communication method in the embodiments of this application. Optionally, the computer-executable instructions in this embodiment of this application may also be referred to as application program code or computer program code. This is not specifically limited in this embodiment of this application.

The transceiver 303 may use any apparatus such as a transceiver, and is configured to communicate with another device or a communications network such as the Ethernet, a radio access network (RAN), or a wireless local area network (WLAN). The transceiver 303 includes a transmitter Tx and a receiver Rx.

The output device 304 communicates with the processor 301, and may display information in a plurality of manners. For example, the output device 304 may be a liquid crystal display (LCD), a light emitting diode (LED) display device, a cathode ray tube (CRT) display device, or a projector.

The input device 305 communicates with the processor 301, and may receive user input in a plurality of manners. For example, the input device 305 may be a mouse, a keyboard, a touchscreen device, or a sensing device.

The access network device 20 includes at least one processor (an example in which the access network device 20 includes one processor 201 is used for description in FIG. 2), at least one transceiver (an example in which the access network device 20 includes one transceiver 203 is used for description in FIG. 2), and at least one network interface (an example in which the access network device 20 includes one network interface 204 is used for description in FIG. 2). Optionally, the access network device 20 may further include at least one memory (an example in which the access network device 20 includes one memory 202 is used for description in FIG. 2). The processor 201, the memory 202, the transceiver 203, and the network interface 204 are connected through a communications line. The network interface 204 is configured to connect to a core network device through a link (for example, an SI interface), or connect to a network interface of another access network device through a wired or wireless link (for example, an X2 interface) (not shown in FIG. 2). This is not specifically limited in this embodiment of this application. In addition, for related descriptions of the processor 201, the memory 202, and the transceiver 203, refer to the descriptions of the processor 301, the memory 302, and the transceiver 303 in the terminal device 30. Details are not described herein again.

Optionally, the access network device 20 in this embodiment of this application is a device that connects the terminal device 30 to a wireless network, and may be an evolved NodeB (eNB or eNodeB) in long term evolution (LTE), a base station in a 5th generation (5G) network or a future evolved public land mobile network (PLMN), a broadband network gateway (BNG), an aggregation switch or a non-third generation partnership project (3GPP) access device, or the like. This is not specifically limited in this embodiment of this application. Optionally, the base station in this embodiment of this application may include base stations in various forms, for example, a macro base station, a micro base station (which is also referred to as a small cell), a relay station, and an access point. This is not specifically limited in this embodiment of this application.

Optionally, the terminal device 30 in this embodiment of this application may be a device such as a terminal or a chip that may be used in a terminal, configured to implement a wireless communication function. The terminal may be user equipment (UE), an access terminal, a terminal unit, a terminal station, a mobile station, a mobile terminal, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like. The terminal may be mobile or in a fixed position.

Optionally, in this embodiment of this application, the access network device 20 and the terminal device 30 shown in FIG. 1 or FIG. 2 may also be referred to as communications apparatuses, and each may be a general-purpose device or a dedicated device. This is not specifically limited in this embodiment of this application.

With reference to FIG. 1 and FIG. 2, the following describes in detail the communication method provided in the embodiments of this application.

It should be noted that, in the following embodiments of this application, a name of a message between network elements or a name or the like of each parameter in the message is merely an example, and may also be another name in specific implementation. This is not specifically limited in this embodiment of this application.

It should be noted that the communication method in the embodiments of this application supports a connection in anonymous mode, and may be used for anonymous transmission or anonymous communication. This is uniformly described herein, and details are not described below again.

Figure 3:
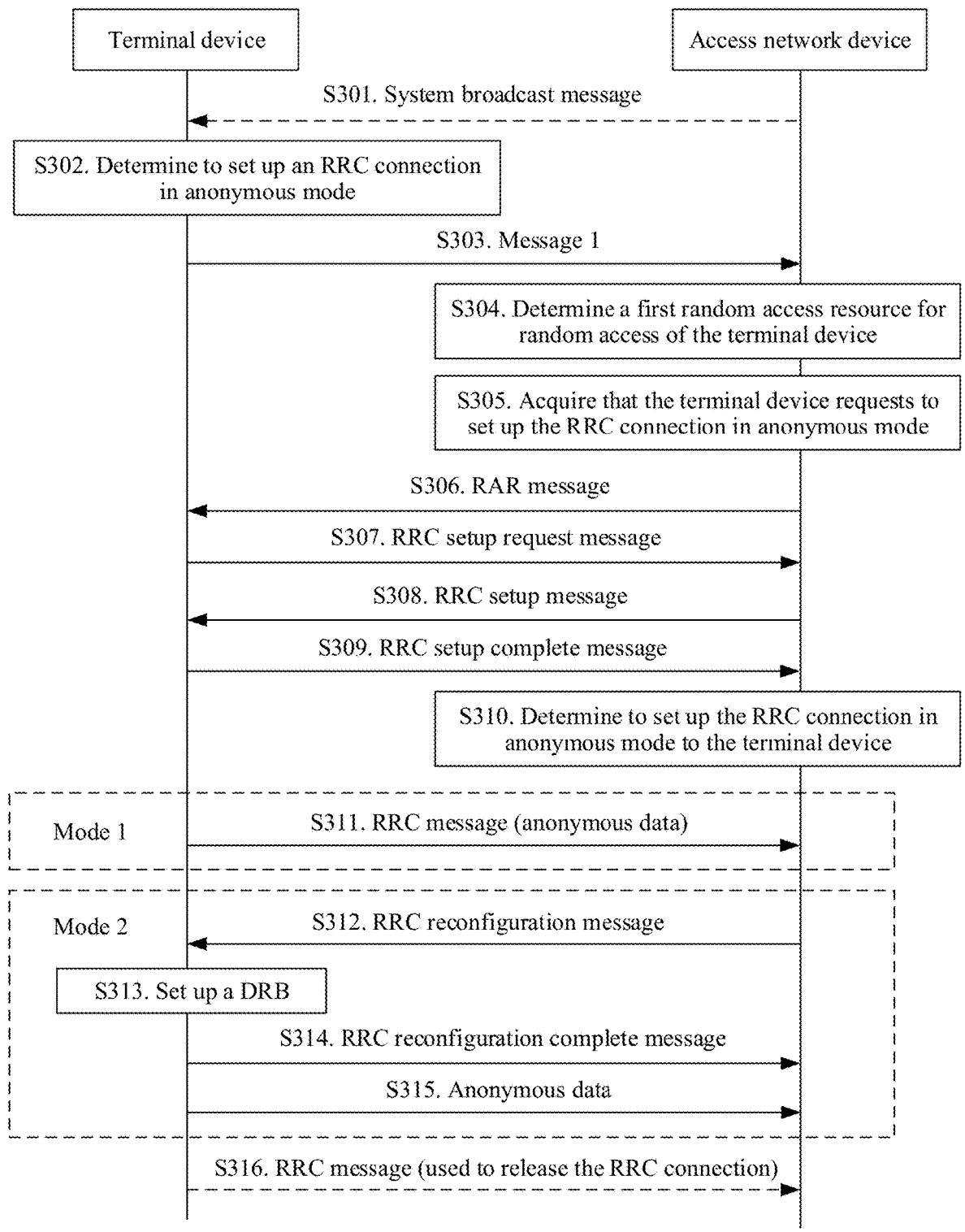
FIG. 3 is a schematic flowchart 1 of a communication method according to an embodiment of this application.

For example, as shown in FIG. 1, the access network device 20 interacts with any terminal device 30, and the access network device 20 is a base station. FIG. 3 shows a communication method according to an embodiment of this application. The method includes the following steps.

S301. A base station sends a message a to a terminal device.

Correspondingly, the terminal device receives the message from the base station.

The message a includes indication information 1, where the indication information 1 is used to indicate configuration information of a dedicated resource used for random access for an RRC connection that the terminal device requests to establish in anonymous mode.

Optionally, in this embodiment of this application, that the indication information 1 is used to indicate configuration information of a dedicated resource used for random access for RRC connection that the terminal device requests to establish in anonymous mode may mean that the indication information 1 includes the configuration information of the dedicated resource used for the random access for the RRC connection that the terminal device requests to establish in anonymous mode, or may mean that the indication information 1 includes an identifier (or an index) or the like of the configuration information of the dedicated resource used for the random access for the RRC connection that the terminal device requests to establish in anonymous mode. Further, the terminal device may determine the configuration information of the dedicated resource based on the identifier (or the index) of the configuration information of the dedicated resource and a correspondence between the configuration information of the dedicated resource and the identifier (or the index) of the configuration information of the dedicated resource. This is not specifically limited in this embodiment of this application.

For example, the message a may be a system broadcast message in FIG. 3. In other words, the base station may broadcast, by using the system broadcast message, the configuration information of the dedicated resource used for the random access for the RRC connection that the terminal device (which is a terminal device for general reference herein) requests to establish in anonymous mode. For example, a system information block (SIB) is specially used to broadcast a configuration related to anonymous transmission, and the SIB may include the configuration information of the dedicated resource used for the random access for the RRC connection that the terminal device requests to establish in anonymous mode.

Optionally, the message may alternatively be another message such as a paging message. This is not specifically limited in this embodiment of this application.

In this embodiment of this application, step S301 may be an optional step. The terminal device may acquire, based on the message a received from the base station, the configuration information of the dedicated resource used for the random access for the RRC connection that the terminal device requests to establish in anonymous mode.

In this embodiment of this application, step S301 may not be performed. Instead, the base station and the terminal device may pre-negotiate the configuration information of the dedicated resource used for the random access for the RRC connection that the terminal device requests to establish in anonymous mode, or preconfigure or pre-agree on the configuration information of the dedicated resource used for the random access for the RRC connection that the terminal device requests to establish in anonymous mode. This is not specifically limited in this embodiment of this application.

Optionally, in this embodiment of this application, the configuration information of the dedicated resource may be any combination of random access preamble information, random access time domain resource information, or random access frequency domain resource information.

For example, the configuration information of the dedicated resource may include the random access preamble information. Alternatively, the configuration information of the dedicated resource may include the random access time domain resource information. Alternatively, the configuration information of the dedicated resource may include the random access frequency domain resource information. Alternatively, the configuration information of the dedicated resource may include random access preamble information on a random access frequency domain resource, in other words, the configuration information of the dedicated resource includes the random access frequency resource information and the random access preamble information. Alternatively, the configuration information of the dedicated resource may include random access preamble information on a random access time domain resource, in other words, the configuration information of the dedicated resource includes the random access time domain resource information and the random access preamble information. Alternatively, the configuration information of the dedicated resource may include a random access frequency domain resource and a random access preamble on the random access time domain resource, in other words, the configuration information of the dedicated resource includes the random access time domain resource information, the random access frequency resource information, and the random access preamble information.

Optionally, in this embodiment of this application, the random access time domain resource information may include, for example, an identifier of a random access time domain resource or a configuration of a random access time domain resource. The configuration of the random access time domain resource may include, for example, configurations of a frame (frame), a symbol (symbol), and a slot (slot).

Optionally, in this embodiment of this application, the random access frequency domain resource information may include, for example, an identifier of a random access frequency domain resource or a configuration of a random access frequency domain resource. The configuration of the random access frequency domain resource may include, for example, configurations of bandwidth and a resource block.

Optionally, in this embodiment of this application, the random access preamble information may include, for example, an identifier of a random access preamble or a configuration of a random access preamble. The configuration of the random access preamble may include, for example, a preamble.

In addition, optionally, the message a in this embodiment of this application may further include indication information 2. The indication information 2 is used by the terminal device to determine whether a serving cell of the terminal device supports anonymous data transmission. For example, the indication information 2 is used to indicate whether the serving cell of the terminal device supports anonymous data transmission; or the indication information 2 is used to indicate whether the serving cell of the terminal device supports establishment of the RRC connection in anonymous mode; or the indication information 2 is used to indicate that the serving cell of the terminal supports anonymous data transmission or supports establishment of the RRC connection in anonymous mode (In other words, if the serving cell of the terminal supports anonymous data transmission or supports establishment of the RRC connection in anonymous mode, the indication information 2 is sent to the terminal device. In this case, if the indication information 2 is not sent, it is considered by default that the serving cell of the terminal supports neither anonymous data transmission nor establishment of the RRC connection in anonymous mode.) The serving cell of the terminal device is a cell that sends the system broadcast message. In this way, when the terminal device needs to transmit anonymous data, the terminal device may determine, based on the indication information 2, to establish the RRC connection in anonymous mode. This is uniformly described herein, and details are not described below again. For other equivalent descriptions of establishing the RRC connection in anonymous mode, refer to the communications system part shown in FIG. 1. Details are not described herein again.

Optionally, in this embodiment of this application, if the serving cell of the terminal device does not support anonymous data transmission or does not support establishment of the RRC connection in anonymous mode, the terminal device may not transmit anonymous data, or may establish the RRC connection in an existing mode and transmit anonymous data. This is not specifically limited in this embodiment of this application.

A mobile operator may control, by using an access network device (for example, the base station in this embodiment of this application), cells in which anonymous data is transmitted or RRC connections are established in anonymous mode. Therefore, impact on a system can be reduced. For example, the mobile operator may choose to transmit anonymous data in a cell with a low load, to reduce an impact of MDT data transmission on user services.

It should be noted that in this embodiment of this application, an example in which the indication information 1 and the indication information 2 may be sent to the terminal device by using one message (for example, the message a) is used for description. Certainly, the indication information 1 and the indication information 2 may alternatively be sent to the terminal device by using different messages. This is not specifically limited in this embodiment of this application.

S302. The terminal device determines to establish the RRC connection in anonymous mode.

Optionally, in this embodiment of this application, the terminal device that determines to establish the RRC connection in anonymous mode may be a terminal device in idle mode. This is uniformly described herein, and details are not described below again.

Optionally, in this embodiment of this application, that the terminal device determines to establish the RRC connection in anonymous mode may include: The terminal device determines, based on the indication information 2, to establish the RRC connection in anonymous mode. For example, when the terminal device needs to transmit anonymous data and acquires, based on the indication information 2, that the serving cell of the terminal device supports establishment of the RRC connection in anonymous mode or supports anonymous data transmission, the terminal device may determine to establish the RRC connection in anonymous mode.

The indication information 2 may also be optional. To be specific, the base station does not indicate, to the terminal device, whether the serving cell of the terminal device supports anonymous data transmission or whether the serving cell of the terminal device supports establishment of the RRC connection in anonymous mode. In this case, if the terminal device needs to transmit data, the terminal device may determine to establish the RRC connection in anonymous mode. For example, the terminal device may determine to establish the RRC connection in anonymous mode when the terminal device needs to transmit MDT data.

S303. The terminal device sends a message b to the base station.

Correspondingly, the base station receives the message b from the terminal device.

The message b includes a preamble used by the terminal device.

The message b is a possible form of the first message of the communications system part shown in FIG. 1.

For example, the message b may be, for example, a message 1 in a random access process in FIG. 3.

It may be understood that the message 1 is the $1^{st}$ message in the random access process, and may also be referred to as a preamble message. This is uniformly described herein, and details are not described below again.

An example in which the message b is the message 1 in the random access process is used for description. Optionally, in this embodiment of this application, the terminal device may send the message 1 to the base station based on the indication information 1 in step S301. For example, a preamble carried by the terminal device in the message 1 may be a preamble corresponding to the preamble information in the configuration information that is of the dedicated resource and that is indicated by the indication information 1. Alternatively, the terminal device may send the message 1 to the base station on a random access time domain resource corresponding to the random access time domain resource information in the configuration information that is of the dedicated resource and that is indicated by the indication information 1. Alternatively, the terminal device may send the message 1 to the base station on a random access frequency domain resource corresponding to the random access frequency domain resource information in the configuration information that is of the dedicated resource and that is indicated by the indication information 1. Alternatively, the terminal device may send the message 1 to the base station on a random access time domain resource corresponding to the random access time domain resource information in the configuration information that is of the dedicated resource and that is indicated by the indication information 1, where the message 1 includes a preamble corresponding to the preamble information in the configuration information that is of the dedicated resource and that is indicated by the indication information 1. Alternatively, the terminal device may send the message 1 to the base station on a random access frequency domain resource corresponding to the random access frequency domain resource information in the configuration information that is of the dedicated resource and that is indicated by the indication information 1, where the message 1 includes a preamble corresponding to the preamble information in the configuration information that is of the dedicated resource and that is indicated by the indication information 1. Alternatively, the terminal device may send the message 1 to the base station on a random access time domain resource corresponding to the random access time domain resource information and a random access frequency domain resource corresponding to the random access frequency domain resource information in the configuration information that is of the dedicated resource and that is indicated by the indication information 1, where the message 1 includes a preamble corresponding to the preamble information in the configuration information that is of the dedicated resource and that is indicated by the indication information 1.

Alternatively, an example in which the message b is the message 1 in the random access process is used for description. Optionally, the terminal device may send the message 1 to the base station based on resource configuration information that is pre-negotiated, preconfigured, or pre-agreed on. For example, a preamble carried by the terminal device in the message 1 may be a preamble corresponding to the preamble information in the pre-negotiated, preconfigured, or pre-agreed configuration information of the dedicated resource. Alternatively, the terminal device may send the message 1 to the base station on a random access time domain resource corresponding to the random access time domain resource information in the pre-negotiated, preconfigured, or pre-agreed configuration information of the dedicated resource. Alternatively, the terminal device may send the message 1 to the base station on a random access frequency domain resource corresponding to the random access frequency domain resource information in the pre-negotiated, preconfigured, or pre-agreed configuration information of the dedicated resource. Alternatively, the terminal device may send the message 1 to the base station on a random access time domain resource corresponding to the random access time domain resource information in the pre-negotiated, preconfigured, or pre-agreed configuration information of the dedicated resource, where the message 1 includes a preamble corresponding to the preamble information in the pre-negotiated, preconfigured, or pre-agreed configuration information of the dedicated resource. Alternatively, the terminal device may send the message 1 to the base station on a random access frequency domain resource corresponding to the random access frequency domain resource information in the pre-negotiated, preconfigured, or pre-agreed configuration information of the dedicated resource, where the message 1 includes a preamble corresponding to the preamble information in the pre-negotiated, preconfigured, or pre-agreed configuration information of the dedicated resource. Alternatively, the terminal device may send the message 1 to the base station on a random access time domain resource corresponding to the random access time domain resource information and a random access frequency domain resource corresponding to the random access frequency domain resource information in the pre-negotiated, preconfigured, or pre-agreed configuration information of the resource, where the message 1 includes a preamble corresponding to the preamble information in the pre-negotiated, preconfigured, or pre-agreed configuration information of the dedicated resource.

S304. The base station determines, based on the message b, a first random access resource for random access performed by the terminal device.

The first random access resource is a dedicated resource used for random access for the RRC connection that the terminal device (which is a terminal device for general reference herein) requests to establish in anonymous mode, and includes any combination of a first random access preamble, a first random access time domain resource, or a first random access frequency domain resource.

Optionally, the configuration information of the dedicated resource includes configuration information of the first random access resource. The configuration information of the first random access resource may be any combination of first random access preamble information, first random access time domain resource information, or first random access frequency domain resource information, and corresponds to the first random access resource. For example, the first random access time domain resource information may include, for example, an identifier or an index of the first random access time domain resource or a configuration of the first random access time domain resource. The configuration of the first random access time domain resource may include, for example, configurations of a frame, a symbol, and a slot. The first random access time domain resource information corresponds to the first random access time domain resource. The first random access frequency domain resource information may include, for example, an identifier or an index of the first random access frequency domain resource or a configuration of the first random access frequency domain resource. The configuration of the first random access frequency domain resource may include, for example, configurations of bandwidth and a resource block. The first random access frequency domain resource information corresponds to the first random access frequency domain resource. The first random access preamble information may include, for example, an identifier of the first random access preamble or a configuration of the first random access preamble. The configuration of the first random access preamble may include, for example, a preamble. The first random access preamble information corresponds to the first random access preamble. This is not specifically limited in this embodiment of this application.

In other words, the first random access resource may be a random access resource in a random access resource set corresponding to the configuration information of the dedicated resource. The first random access preamble corresponds to the preamble carried in the message 1 in step S303, the first random access time domain resource corresponds to the random access time domain resource used for sending the message 1 in step S303, and the first random access frequency domain resource corresponds to the random access frequency domain resource used for sending the message 1 in step S303. For related descriptions, refer to step S303. Details are not described herein again.

S305. The base station acquires, based on the first random access resource, that the terminal device requests to establish the RRC connection in anonymous mode.

Optionally, in this embodiment of this application, for steps S303 to S305, an alternative solution is that the terminal device sends a message b in a random access process to the base station, where the message b carries information used to indicate the terminal device to request to establish the RRC connection in anonymous mode. Further, the base station acquires, based on the information, that the terminal device requests to establish the RRC connection in anonymous mode. This is not specifically limited in this embodiment of this application.

S306. The base station sends a message c to the terminal device.

Correspondingly, the terminal device receives the message c from the base station.

The message c includes a temporary cell radio network temporary identifier (TC-RNTI) allocated by the base station to the terminal device.

The message c is a response message for the message b. Optionally, as shown in FIG. 3, when the message b is the message 1 in the random access process, the message c may be, for example, a random access response (random access response, RAR) message.

The TC-RNTI becomes a cell radio network temporary identifier (C-RNTI) of the terminal device after random access is completed. Subsequently, the base station and the terminal device perform anonymous data transmission based on the C-RNTI. Because the C-RNTI is allocated by the base station to the terminal device when the base station does not know a user identity, even if the base station subsequently communicates with the terminal device based on the C-RNTI, there is no privacy issue.

S307. The terminal device sends a message d to the base station.

Correspondingly, the base station receives the message d from the terminal device.

For example, the message d may be, for example, an RRC setup request message in FIG. 3.

In a conventional technology, if a terminal device registers with a core network, the core network allocates a terminal identifier of a non-access stratum to the terminal device, to identify the terminal. For example, the terminal identifier of the non-access stratum may be an S-TMSI or a 5G S-TMSI. The RRC setup request carries the terminal identifier of the non-access stratum or a part of fields of the terminal identifier, or identification information (for example, an extended identifier) including the terminal identifier. If a terminal device does not register with a core network, an RRC setup complete message carries a core network identifier of registration. Different from the conventional technology, optionally, because in this embodiment of this application anonymous data transmission needs to be implemented, in this embodiment of this application, regardless of whether a core network device allocates a terminal identifier, for example, an S-TMSI or a 5G S-TMSI, to the terminal device, the message d carries none of a terminal identifier of a non-access stratum or a part of fields of the terminal identifier, or identification information (for example, an extended identifier) including the terminal identifier, but carries a value generated or determined by the terminal device, for example, a random value. The random value is used by the terminal device to perform contention resolution for random access. For example, after obtaining the random value, the base station may return the random value in a response message (which is not shown in FIG. 3, and may be, for example, a contention conflict resolution message) for the message d. Further, the terminal device determines, based on whether the random value returned by the base station is the value sent by the terminal device, whether terminal device succeeds in contention. If the random value returned by the base station is the value sent by the terminal device, it is considered that the terminal device succeeds in contention. Otherwise, it is considered that the terminal device fails in contention.

Optionally, a terminal device may establish an RRC connection in anonymous mode for a plurality of times to report anonymous data. To enable the system to associate the anonymous data reported by the terminal device for the plurality of times with the terminal device, a possible implementation is: After the terminal device generates or determines a value (for example, a random value), a subsequent RRC connection in anonymous mode also uses the value, so that the anonymous data reported by the terminal device for the plurality of times can be associated.

The message d in step S307 may be scrambled by using the TC-RNTI in step S306. For related implementation, refer to an existing implementation. Details are not described herein again.

S308. The base station sends a message e to the terminal device.

Correspondingly, the terminal device receives the message e from the base station.

For example, the message e may be, for example, the RRC setup message in FIG. 3.

It should be noted that in this embodiment of this application, an example in which the terminal device is a terminal device that succeeds in random access contention is used for description. If the terminal device fails in contention, a subsequent procedure is not performed. This is uniformly described herein, and details are not described below again.

S309. The terminal device sends a message f to the base station.

Correspondingly, the base station receives the message f from the terminal device.

For example, the message f may be, for example, an RRC setup complete message in FIG. 3.

Optionally, in this embodiment of this application, because anonymous data transmission is expected to be implemented, in this embodiment of this application, regardless of whether the terminal device is registered with the core network, the message f does not carry information about registration of the terminal device with the core network. For example, the message f does not carry a core network identifier of registration.

Alternatively, optionally, in this embodiment of this application, because anonymous data transmission is expected to be implemented, in this embodiment of this application, regardless of whether the terminal device is registered with the core network, the message f does not carry a non-access stratum (NAS) protocol data unit (PDU) information element, or the message f carries a NAS PDU information element whose length is 0). The NAS PDU information element is signaling exchanged between the base station and the core network device.

The message f does not carry the information about registration of the terminal device with the core network, or the message f does not carry the NAS PDU information element, or the message f carries the NAS PDU information element whose length is 0. In this case, not only signaling overheads can be reduced, but also user information can be better hidden.

S310. The base station determines to establish the RRC connection in anonymous mode to the terminal device.

In a possible implementation, that the base station determines to establish the RRC connection in anonymous mode to the terminal device includes: The base station skips performing a step of establishing a connection for the terminal device to the core network device.

In this embodiment of this application, the connection between the base station and the core network device for the terminal device may be, for example, an N2 connection or a next generation NG connection (namely, a UE-associated logical NG-connection) for the terminal device in a new radio (NR) system. Alternatively, the connection between the base station and the core network device for the terminal device may be, for example, an SI connection for the terminal device in an LTE system. This is not specifically limited in this embodiment of this application.

The step of establishing the connection for the terminal device to the core network device may include: For example, the base station sends an initial UE message to the core network device, so that the core network device performs authentication or authorization on the terminal device after receiving the initial UE message from the base station. Further, the core network device sends an initial context setup request to the base station, and the base station returns an initial context setup response to the core network device. For details, refer to an existing implementation. Details are not described herein.

It should be noted that, in this embodiment of this application, that the base station skips performing a step of establishing a connection for the terminal device to the core network device may mean that in anonymous mode, the connection between the base station and the terminal device is established without involving the core network device; the base station skips the step of establishing the connection for the terminal device to the core network device; the base station ignores the step of establishing the connection for the terminal device to the core network device; or the base station does not initiate the step of establishing the connection for the terminal device to the core network device, or the like. This is not specifically limited in this embodiment of this application.

In other words, in this embodiment of this application, after acquiring that the terminal device requests to establish the RRC connection in anonymous mode, the base station does not need to establish the connection for the terminal device to the core network device.

In another possible implementation, that the base station determines to establish the RRC connection in anonymous mode to the terminal device includes: The base station establishes a connection for the terminal device to the core network device, but the terminal device does not send, to the core network device, identity information by using which the terminal device can be directly or indirectly identified, for example, an IMSI, an SUPI, an S-TMSI, or a 5G-TMSI. This is not specifically limited in this embodiment of this application.

After the base station determines to establish the RRC connection in anonymous mode to the terminal device, anonymous transmission on an air interface may be performed between the base station and the terminal device without identifying a user identity. The following provides examples of two anonymous transmission modes.

Optionally, in a possible implementation, anonymous data may be transmitted via a control plane. For example, as shown in FIG. 3, the communication method provided in this embodiment of this application may further include the following step S311.

S311. The terminal device sends a message g to the base station.

Correspondingly, the base station receives the message g from the terminal device.

The message g carries the anonymous data. In other words, the anonymous data is transmitted over a signaling bearer.

The message g may be a possible form of a second message in this embodiment of this application.

For example, the message g may be, for example, an RRC message in FIG. 3. Optionally, the RRC message may be a dedicated RRC message used to transmit anonymous data. For example, the RRC message may be an anonymous data transfer (anonymous data transfer) message.

Optionally, the anonymous data in this embodiment of this application may include MDT data, other data that needs to be anonymously transmitted, or the like. This is uniformly described herein, and details are not described below again.

Optionally, in this embodiment of this application, the anonymous data used as an information element in the RRC message may be a byte stream transparent to an RRC layer, or may be a specific anonymously transmitted data structure (for example, an MDT data structure).

For example, a structure of the byte stream is as follows:
Anonymous DataTransfer::=Sequence
{
Anonymous Data Octet string
}

It should be noted that, in this embodiment of this application, the byte stream transparent to the RRC layer means that the byte stream is simply a byte stream from the perspective of the RRC layer, and the RRC layer does not decode the byte stream. In other words, the RRC layer does not know a meaning of content of the byte stream. This is uniformly described herein, and details are not described below again.

A specific data structure (for example, the MDT data structure) that is anonymously transmitted is not specifically limited in this embodiment of this application.

Optionally, in this embodiment of this application, after receiving the message g from the terminal device, the base station obtains the anonymous data from the message g, and may further deliver the anonymous data to another protocol layer, an operation administration and maintenance (OAM) system, or the like. The another protocol layer may be, for example, an MDT protocol layer. This is not specifically limited in this embodiment of this application.

It should be noted that the message g in this embodiment of this application may be one or more messages. This specifically depends on a size of the anonymous data. This is uniformly described herein, and details are not described below again.

Optionally, in a possible implementation, the anonymous data may be transmitted via a user plane. For example, as shown in FIG. 3, the communication method provided in this embodiment of this application may further include the following steps S312 to S315.

S312. The base station sends a message h to the terminal device.

Correspondingly, the terminal device receives the message h from the base station.

The message h is used to indicate to establish a data radio bearer (DRB).

The message h may be a possible form of a third message in this embodiment of this application.

For example, the message h may be, for example, an RRC reconfiguration message in FIG. 3.

Optionally, in this embodiment of this application, that the message h is used to indicate to establish a DRB may be: For example, the message h includes information used to indicate to establish the DRB, or the message h has a function of indicating to establish the DRB. This is not specifically limited in this embodiment of this application.

Optionally, in this embodiment of this application, to distinguish the DRB from a common DRB, the message h may further include information used to indicate that the DRB is used for anonymous data transmission. It may be understood that, in a scenario in which the anonymous data is the MDT data, the information used to indicate that the DRB is used for anonymous data transmission may be specifically information used to indicate that the DRB is used for MDT data transmission.

Optionally, in this embodiment of this application, bearer type information or an MDT bearer type may be introduced to indicate that current data transmission is MDT data transmission. This is uniformly described herein, and details are not described below again.

In addition, different from a conventional DRB, the DRB does not have a configuration such as a mapping relationship between a quality of service (QOS) flow identifier and the DRB. This is uniformly described herein, and details are not described below again.

S313. The terminal device establishes a corresponding DRB based on the information used to indicate to establish the DRB.

For a specific manner of establishing the DRB, refer to the conventional technology, and details are not described herein.

S314. The terminal device sends a message i to the base station.

Correspondingly, the base station receives the message i from the terminal device. The message i is used to indicate that DRB establishment is completed.

For example, the message i may be, for example, an RRC reconfiguration complete message in FIG. 3.

S315. The terminal device sends, on the DRB, anonymous data to the base station.

Correspondingly, the base station receives, from the DRB, the anonymous data from the terminal device.

Different from a common DRB that sends data to a user plane of a core network, for example, a serving gateway, optionally, in this embodiment of this application, after receiving, from the DRB, the anonymous data from the terminal device, the base station may deliver the anonymous data to another protocol layer, an OAM system, or the like. The other protocol layer may be, for example, an MDT protocol layer. This is not specifically limited in this embodiment of this application.

It should be noted that step S314 and step S315 are not subject to a specific sequence in this embodiment of this application. Step S314 may be performed before step S315, step S315 may be performed before S314, or step S314 and step S315 may be performed simultaneously. This is not specifically limited in this embodiment of this application.

The anonymous data transmission may be implemented by using step S311 or steps S312 to S315. Because a DRB does not need to be establish in a mode of transmitting anonymous data via the control plane, compared with a mode of transmitting anonymous data via the user plane, the mode of transmitting the anonymous data via the control plane is simpler. The anonymous data does not need to be obtained by decoding an RRC message. Therefore, compared with the mode of transmitting the anonymous data via the control plane, the mode of transmitting the anonymous data via the user plane reduces processing resource overheads of the base station.

In conventional data transmission, an access stratum (for example, an RRC layer) of a terminal device does not know whether data transmission is completed. Therefore, an RRC connection is released by a base station. However, for anonymous data, such as MDT data, because the anonymous data is generated by an access stratum, the access stratum knows whether anonymous data transmission is completed. Therefore, optionally, in this embodiment of this application, after data transmission is completed or when the last anonymous data packet is transmitted, the terminal device notifies the base station that the anonymous data transmission is completed or requests the base station to release the RRC connection corresponding to the terminal device, so that the RRC connection corresponding to the terminal device can be released in time, and power consumption of the terminal device can be reduced. For example, the following methods may be used.

In a possible implementation, if step S311 is performed, indication information 3 may be carried in the message g in step S311, where the indication information 3 is used to indicate whether anonymous data transmission is completed or used to indicate whether a current anonymous data packet is the last anonymous data packet. Therefore, after receiving the message g, if the base station acquires, based on the indication information 3, that the anonymous data transmission is completed or that the current anonymous data packet is the last anonymous data packet, the base station may release the RRC connection corresponding to the terminal device. A schematic structure corresponding to the message g is as follows:

Anonymous Data Transfer::=Sequence
{
Anonymous Data Octet string
LastData Enumerated {true} Optional
}

Alternatively, in still another possible implementation, if steps S312 to S315 are performed, indication information 4 may be included to a header of a layer 2 of the DRB, where the indication information 4 is used to indicate whether anonymous data transmission is completed or used to indicate whether a current anonymous data packet is the last anonymous data packet. Therefore, after parsing the header of the layer 2 of the DRB, if the base station acquires that the anonymous data transmission is completed or acquires that the current anonymous data packet is the last anonymous data packet, the base station may release the RRC connection corresponding to the terminal device.

For example, the layer 2 of the DRB herein may be, for example, a packet data convergence protocol (PDCP) layer, a radio link control (RLC) protocol layer, or a media access control (MAC) protocol layer.

Alternatively, optionally, in yet another possible implementation, if step S311 is performed, or if steps S312 to S315 are performed, the communication method provided in this embodiment of this application may further include the following step S316.

S316. The terminal device sends a message j to the base station.

Correspondingly, the base station receives the message j from the terminal device.

For example, the message j may be, for example, the RRC message in FIG. 3.

The message j may be a possible form of a fourth message in this embodiment of this application.

That the message j is an RRC message is used as an example. Optionally, the RRC message may be a dedicated message used to indicate that data transmission is completed or used to indicate whether a current anonymous data packet is the last anonymous data packet. For example, the RRC message may be an anonymous data transfer complete message. In this way, after receiving the RRC message, the base station may release the RRC connection corresponding to the terminal device based on the RRC message.

Alternatively, that the message j is an RRC message is used as an example. Optionally, the RRC message may be a message used to indicate to request to release the RRC connection corresponding to the terminal device. For example, the RRC message may be an RRC release request message, or may be a dedicated message used to indicate to request to release the RRC connection corresponding to the terminal device. This is not specifically limited in this embodiment of this application. In this way, after receiving the RRC message, the base station may release the RRC connection corresponding to the terminal device based on the RRC message. Optionally, in this scenario, the RRC message may further carry a cause value for requesting to release the RRC connection corresponding to the terminal device. For example, the cause value may be that data transmission is completed. This is not specifically limited in this embodiment of this application.

Based on the foregoing several possible implementations, after the anonymous data transmission is completed, the base station may release the RRC connection corresponding to the terminal device in time, to reduce power consumption of the terminal device.

Optionally, in this embodiment of this application, if the terminal device determines that the RRC connection does not need to be established in anonymous mode, the terminal device may establish the RRC connection and transmit data in an existing mode. This is not specifically limited in this embodiment of this application.

In conclusion, based on the communication method provided in this embodiment of this application, the anonymous data transmission can be implemented, so that security and the user privacy in a data transmission process can be protected. In a possible implementation, the anonymous data may be, for example, MDT data, so that security and user privacy issues in an MDT data transmission process can be alleviated.

The processor 201 in the access network device 20 shown in FIG. 2 may invoke the application program code stored in the memory 202, to instruct the base station to perform the actions of the base station in steps S301 to S316. The processor 301 in the terminal device 30 shown in FIG. 2 may invoke the application program code stored in the memory 302, to instruct the terminal device to perform the actions of the terminal device in steps S301 to S316. This is not limited in this embodiment.

Figure 4:
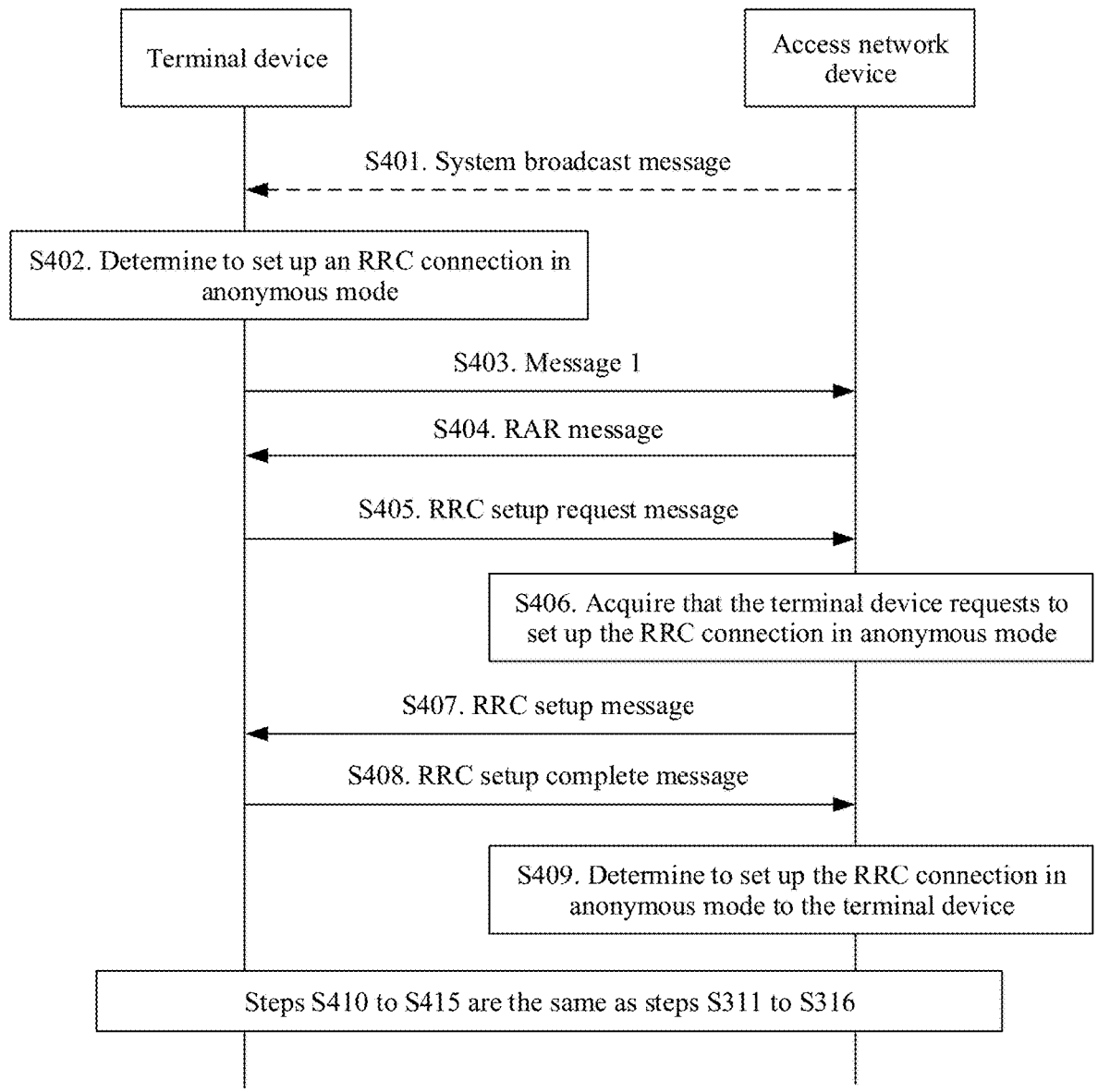
FIG. 4 is a schematic flowchart 2 of a communication method according to an embodiment of this application.

Alternatively, optionally, that the access network device 20 shown in FIG. 1 interacts with any terminal device 30, and the access network device 20 is a base station is used as an example. FIG. 4 shows another communication method according to an embodiment of this application. The communication method includes the following steps.

S401. Optionally, a base station sends a message k to a terminal device.

Correspondingly, the terminal device receives the message k from the base station.

The message k may include indication information 2. For related descriptions of the indication information 2, refer to step S301. Details are not described herein again.

For example, the message k may be, for example, a paging message or a system broadcast message in FIG. 4. This is not specifically limited in this embodiment of this application.

Optionally, in this embodiment of this application, if the serving cell of the terminal device does not support anonymous data transmission or does not support establishment of an RRC connection in anonymous mode, the terminal device may not transmit anonymous data, or may establish the RRC connection in an existing mode and transmit anonymous data. This is not specifically limited in this embodiment of this application.

A mobile operator may control, by using an access network device (for example, the base station in this embodiment of this application), cells in which anonymous data is transmitted or RRC connections are established in anonymous mode. Therefore, impact on a system can be reduced. For example, the mobile operator may choose to transmit anonymous data in a cell with a low load, to reduce an impact of MDT data transmission on user services.

S402. The terminal device determines to establish the RRC connection in anonymous mode.

For related descriptions of step S402, refer to step S302 in the embodiment shown in FIG. 3. Details are not described herein again.

S403. The terminal device sends a message m to the base station.

Correspondingly, the base station receives the message m from the terminal device.

The message m includes a preamble used by the terminal device.

For example, the message m may be, for example, a message 1 in a random access process in FIG. 4.

It may be understood that the message 1 is the $1^{st}$ message in the random access process, and may also be referred to as a preamble message. This is uniformly described herein, and details are not described below again.

S404. The base station sends a message n to the terminal device.

Correspondingly, the terminal device receives the message n from the base station.

The message n includes a TC-RNTI allocated by the base station to the terminal device.

The message n is a response message for the message m. Optionally, as shown in FIG. 4, when the message m is the message 1 in the random access process, the message n may be, for example, an RAR message.

The TC-RNTI becomes a C-RNTI of the terminal device after random access is completed. Subsequently, the base station and the terminal device perform anonymous data transmission based on the C-RNTI. Because the C-RNTI is allocated by the base station to the terminal device when the base station does not know a user identity, even if the base station subsequently communicates with the terminal device based on the C-RNTI, there is no privacy issue.

S405. The terminal device sends a message p to the base station.

Correspondingly, the base station receives the message p from the terminal device.

The message p may be a possible form of the first message of the communications system part shown in FIG. 1.

For example, the message p may be, for example, an RRC setup request message in FIG. 4.

An example in which the message p is the RRC setup request message is used for description. In this case, the RRC setup request message may carry indication information 5, where the indication information 5 is used to indicate the terminal device to request to establish the RRC connection in anonymous mode. Optionally, in a possible implementation, the RRC setup request message carries a cause value, such as "anonymous transmission" or "MDT transmission". The cause value is used to indicate that terminal device requests to establish the RRC connection in anonymous mode. In other words, the indication information 5 may be a cause value.

Alternatively, for example, the message p may be a dedicated message used to indicate the terminal device to request to establish the RRC connection in anonymous mode. For example, the message p may be, for example, an anonymous RRC setup request message.

In addition, for other related descriptions of step S405, refer to step S307 in the embodiment shown in FIG. 3. For example, a difference lies in that the message d in step S307 is replaced with the message p in step S405. Details are not described herein again.

S406. The base station acquires, based on the message p, that the terminal device requests to establish the RRC connection in anonymous mode.

In a possible implementation, if the message p in step S405 carries the indication information 5, the base station acquires, based on the indication information 5, that the terminal device requests to establish the RRC connection in anonymous mode.

Alternatively, in another possible implementation, if the message p in step S405 is the dedicated message used to indicate the terminal device to request to establish the RRC connection in anonymous mode, the base station may acquire, based on the dedicated message, that the terminal device requests to establish the RRC connection in anonymous mode.

S407. The base station sends a message q to the terminal device.

Correspondingly, the terminal device receives the message q from the base station.

For example, the message q may be, for example, an RRC setup message in FIG. 4.

Alternatively, for example, if the message p in step S405 is the dedicated message used to indicate the terminal device to request to establish the RRC connection in anonymous mode, for example, the anonymous RRC setup request message, the message q in step S407 may be an anonymous RRC setup message. This is not specifically limited in this embodiment of this application.

It should be noted that in this embodiment of this application, an example in which the terminal device is a terminal device that succeeds in random access contention is used for description. If the terminal device fails in contention, a subsequent procedure is not performed. This is uniformly described herein, and details are not described below again.

S408. The terminal device sends a message r to the base station.

Correspondingly, the base station receives the message r from the terminal device.

For example, the message r may be, for example, an RRC setup complete message in FIG. 4.

Alternatively, for example, if the message q in step S407 is the anonymous RRC setup message, the message r in step S408 may be an anonymous RRC setup complete message. This is not specifically limited in this embodiment of this application.

In addition, for other related descriptions of step S408, refer to step S309 in the embodiment shown in FIG. 3. For example, a difference lies in that the message f in step S309 is replaced with the message r in step S408. Details are not described herein again.

S409. The base station determines to establish the RRC connection in anonymous mode to the terminal device.

For other related descriptions of step S409, refer to step S310 in the embodiment shown in FIG. 3. Details are not described herein again.

After the base station determines to establish the RRC connection in anonymous mode to the terminal device, anonymous transmission on an air interface may be performed between the base station and the terminal device without identifying a user identity. For related implementation of anonymous transmission (namely, steps S410 to S415 in FIG. 4), refer to steps S311 to S316 in the embodiment shown in FIG. 3. Details are not described herein again.

In conclusion, based on the communication method provided in this embodiment of this application, the anonymous data transmission can be implemented, so that security and the user privacy in a data transmission process can be protected. In a possible implementation, anonymous data may be, for example, MDT data, so that security and user privacy issues in an MDT data transmission process can be alleviated.

The processor 201 in the access network device 20 shown in FIG. 2 may invoke the application program code stored in the memory 202, to instruct the base station to perform the actions of the base station in steps S401 to S415. The processor 301 in the terminal device 30 shown in FIG. 2 may invoke the application program code stored in the memory 302, to instruct the terminal device to perform the actions of the terminal device in steps S401 to S415. This is not limited in this embodiment.

Figure 5:
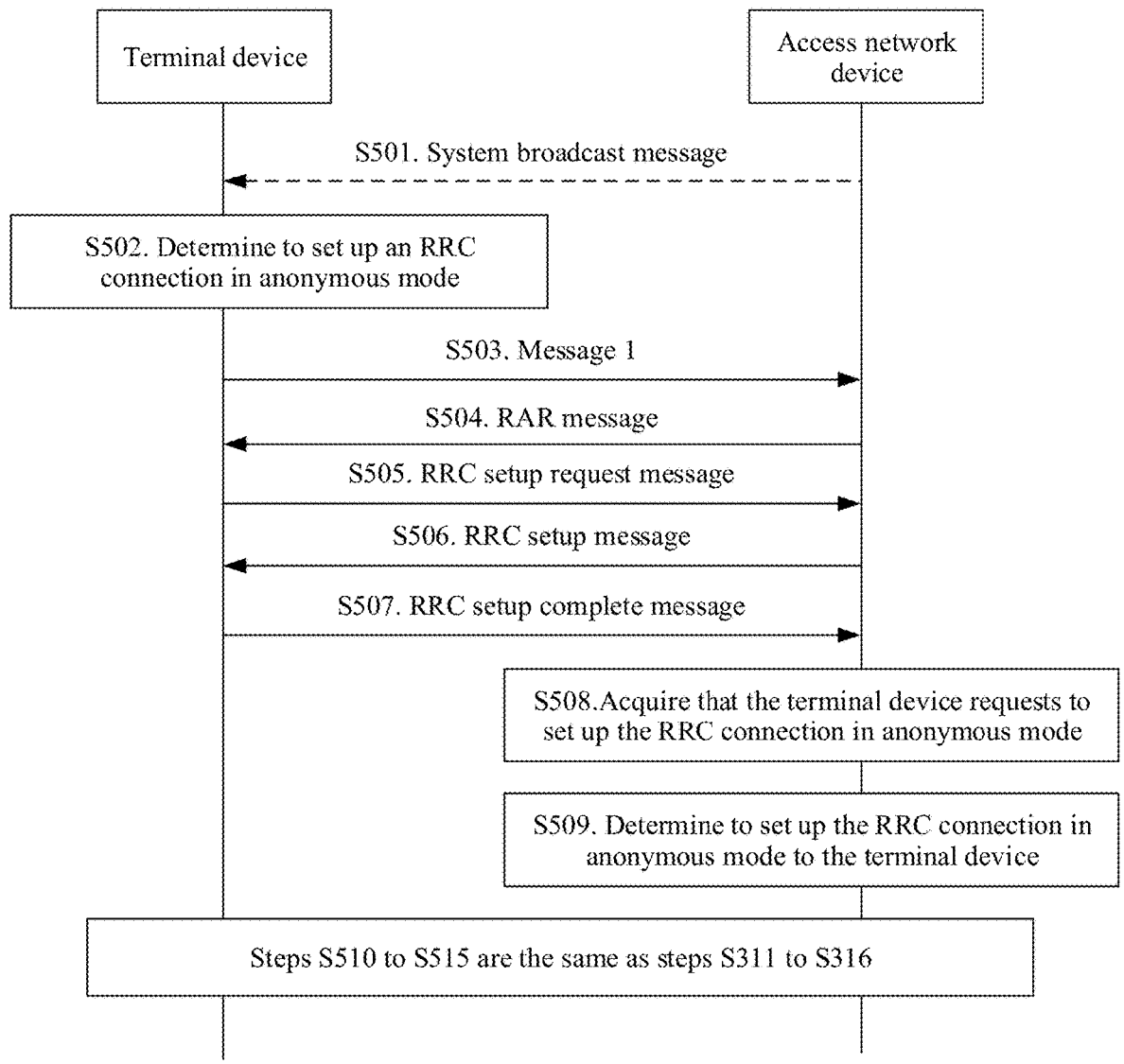
FIG. 5 is a schematic flowchart 3 of a communication method according to an embodiment of this application.

Alternatively, optionally, that the access network device 20 shown in FIG. 1 interacts with any terminal device 30, and the access network device 20 is a base station is used as an example. FIG. 5 shows another communication method according to an embodiment of this application. The communication method includes the following steps.

S501. Optionally, a base station sends a message k to a terminal device.

Correspondingly, the terminal device receives the message k from the base station.

The message k may include indication information 2. For related descriptions of the indication information 2, refer to step S301. Details are not described herein again.

For other related descriptions of step S501, refer to step S401 in the embodiment shown in FIG. 4. Details are not described herein again.

S502. The terminal device determines to establish an RRC connection in anonymous mode.

For related descriptions of step S502, refer to step S402 in the embodiment shown in FIG. 4. Details are not described herein again.

S503. The terminal device sends a message m to the base station.

Correspondingly, the base station receives the message m from the terminal device.

The message m includes a preamble used by the terminal device.

For related descriptions of step S503, refer to step S403 in the embodiment shown in FIG. 4. Details are not described herein again.

S504. The base station sends a message n to the terminal device.

Correspondingly, the terminal device receives the message n from the base station.

The message n includes a TC-RNTI allocated by the base station to the terminal device.

For related descriptions of step S504, refer to step S404 in the embodiment shown in FIG. 4. Details are not described herein again.

S505. The terminal device sends a message d to the base station.

Correspondingly, the base station receives the message d from the terminal device.

For related descriptions of step S505, refer to step S307 in the embodiment shown in FIG. 3. Details are not described herein again.

S506. The base station sends a message e to the terminal device.

Correspondingly, the terminal device receives the message e from the base station.

For related descriptions of step S506, refer to step S308 in the embodiment shown in FIG. 3. Details are not described herein again.

S507. The terminal device sends a message s to the base station.

Correspondingly, the base station receives the message s from the terminal device.

The message s may be a possible form of the first message of the communications system part shown in FIG. 1.

For example, the message s may be, for example, an RRC setup complete message in FIG. 5.

Optionally, in this embodiment of this application, the message s may carry indication information 5, where the indication information 5 is used to indicate the terminal device to request to establish the RRC connection in anonymous mode.

In addition, for other related descriptions of step S507, refer to step S309 in the embodiment shown in FIG. 3. For example, a difference lies in that the message f in step S309 is replaced with the message s in step S507. Details are not described herein again.

S508. The base station acquires, based on the message s, that the terminal device requests to establish the RRC connection in anonymous mode.

In a possible implementation, if the message s in step S507 carries the indication information 5, the base station acquires, based on the indication information 5, that the terminal device requests to establish the RRC connection in anonymous mode.

Alternatively, in another possible implementation, after determining that the message s does not carry a NAS PDU information element or the message s carries a NAS PDU information element whose length is 0, the base station may acquire that the terminal device requests to establish the RRC connection in anonymous mode. This is not specifically limited in this embodiment of this application.

S509. The base station determines to establish the RRC connection in anonymous mode to the terminal device.

For other related descriptions of step S509, refer to step S310 in the embodiment shown in FIG. 3. Details are not described herein again.

After the base station determines to establish the RRC connection in anonymous mode to the terminal device, anonymous transmission on an air interface may be performed between the base station and the terminal device without identifying a user identity. For related implementation of anonymous transmission (namely, steps S510 to S515 in FIG. 5), refer to steps S311 to S316 in the embodiment shown in FIG. 3. Details are not described herein again.

In conclusion, based on the communication method provided in this embodiment of this application, the anonymous data transmission can be implemented, so that security and the user privacy in a data transmission process can be protected. In a possible implementation, anonymous data may be, for example, MDT data, so that security and user privacy issues in an MDT data transmission process can be alleviated.

The processor 201 in the access network device 20 shown in FIG. 2 may invoke the application program code stored in the memory 202, to instruct the base station to perform the actions of the base station in steps S501 to S515. The processor 301 in the terminal device 30 shown in FIG. 2 may invoke the application program code stored in the memory 302, to instruct the terminal device to perform the actions of the terminal device in steps S501 to S515. This is not limited in this embodiment.

It should be noted that in the embodiments shown in FIG. 3 to FIG. 5, the indication information 5 may also be referred to as first indication information, the indication information 1 may also be referred to as second indication information, the indication information 3 may also be referred to as third indication information, the indication information 4 may also be referred to as fourth indication information, and the indication information 2 may also be referred to as fifth indication information. This is uniformly described herein, and details are not described below again.

It may be understood that, in the foregoing embodiments, methods and/or steps implemented by the terminal device may also be implemented by a component (for example, a chip or a circuit) that can be used in the terminal device, and methods and/or steps implemented by the base station may also be implemented by a component that can be used in the base station.

The foregoing mainly describes the solutions provided in the embodiments of this application from a perspective of interaction between network elements. Correspondingly, an embodiment of this application further provides a communications apparatus. The communications apparatus is configured to implement the foregoing methods. The communications apparatus may be the terminal device in the foregoing method embodiments, or an apparatus including the foregoing terminal device, or a component that can be used in the terminal device. Alternatively, the communications apparatus may be the access network device in the foregoing method embodiments, or an apparatus including the foregoing access network device, or a component that can be used in the access network device. It can be understood that, to implement the foregoing functions, the communications apparatus includes a corresponding hardware structure and/or software module for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 6:
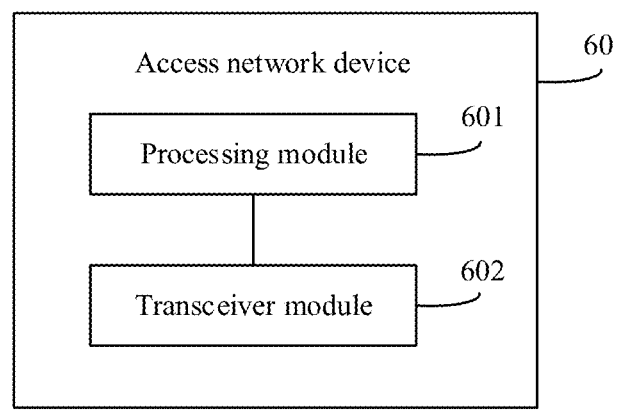
FIG. 6 is another schematic structural diagram of an access network device according to an embodiment of this application.

For example, the communications apparatus is the access network device in the foregoing method embodiments. FIG. 6 is a schematic structural diagram of an access network device 60. The access network device 60 includes a processing module 601 and a transceiver module 602. The transceiver module 602 may also be referred to as a transceiver unit, and is configured to implement a sending and/or receiving function, for example, may be a transceiver circuit, a transceiver, a transceiver, or a communications interface.

The transceiver module 602 is configured to receive a first message from a terminal device, where the first message is used to indicate the terminal device to request to establish an RRC connection in anonymous mode. The processing module 601 is configured to acquire, based on the first message, that the terminal device requests to establish the RRC connection in anonymous mode. The processing module 601 is further configured to determine to establish the RRC connection in anonymous mode to the terminal device.

Optionally, that the processing module 601 is configured to determine to establish the RRC connection in anonymous mode to the terminal device, the processing module 601 is specifically configured to: skip performing a step of establishing a connection for the terminal device to a core network device. For related descriptions that the processing module 601 is configured to skip performing a step of establishing a connection for the terminal device to a core network device, refer to the foregoing method embodiments. Details are not described herein again.

Optionally, that the processing module 601 is configured to determine to establish the RRC connection in anonymous mode to the terminal device, the processing module 601 is specifically configured to establish a connection for the terminal device to the core network device, but the terminal device does not send, to the core network device, identity information by using which the terminal device can be directly or indirectly identified, for example, an IMSI, a SUPI, an S-TMSI, or a 5G S-TMSI.

In a possible implementation, the first message carries first indication information, where the first indication information is used to indicate the terminal device to request to establish the RRC connection in anonymous mode.

In another possible implementation, the first message is a dedicated message used to indicate the terminal device to request to establish the RRC connection in anonymous mode.

In still another possible implementation, the first message is an RRC setup complete message. Correspondingly, that the processing module 601 is configured to acquire, based on the first message, that the terminal device requests to establish the RRC connection in anonymous mode, the processing module 601 is specifically configured to: determine that the RRC setup complete message does not carry a NAS PDU information element or that the RRC setup complete message carries a NAS PDU information element whose length is 0); and acquire that the terminal device requests to establish the RRC connection in anonymous mode.

In still another possible implementation, the transceiver module 602 is specifically configured to receive, on a first random access resource, the first message from the terminal device, where the first random access resource is a dedicated resource used for random access for the RRC connection that the terminal device requests to establish in anonymous mode. Correspondingly, that the processing module 601 is configured to acquire, based on the first message, that the terminal device requests to establish the RRC connection in anonymous mode, the processing module 601 is specifically configured to: acquire, based on the first random access resource, that the terminal device requests to establish the RRC connection in anonymous mode.

Optionally, the transceiver module 602 is further configured to send second indication information, where the second indication information is used to indicate configuration information of the dedicated resource used for the random access for the RRC connection that the terminal device requests to establish in anonymous mode, the configuration information is any combination of random access preamble information, random access time domain resource information, and random access frequency domain resource information, and the configuration information includes configuration information of the first random access resource.

Optionally, the transceiver module 602 is further configured to receive a second message from the terminal device, where the second message carries anonymous data. For example, the second message may be an RRC message.

Optionally, the second message further carries third indication information, where the third indication information is used to indicate that data transmission is completed or that the anonymous data is the last packet of anonymous data. Correspondingly, the processing module 601 is further configured to release the RRC connection corresponding to the terminal device based on the third indication information.

Optionally, the transceiver module 602 is further configured to send a third message to the terminal device, where the third message is used to indicate to establish a data bearer DRB. The transceiver module 602 is further configured to receive, from the DRB, anonymous data from the terminal device.

Optionally, the transceiver module 602 is further configured to receive, from the DRB, fourth indication information from the terminal device, where the fourth indication information is used to indicate that data transmission is completed or that the anonymous data is the last packet of anonymous data. Correspondingly, the processing module 601 is further configured to release the RRC connection corresponding to the terminal device based on the fourth indication information.

Optionally, the transceiver module 602 is further configured to receive a fourth message from the terminal device, where the fourth message is used to indicate that data transmission is completed or that the anonymous data is the last packet of anonymous data, or the fourth message is used to request to release the RRC connection corresponding to the terminal device. The processing module 601 is further configured to release the RRC connection corresponding to the terminal device based on the fourth message.

Optionally, the transceiver module 602 is further configured to send fifth indication information, where the fifth indication information is used to indicate that a serving cell of the terminal device supports anonymous data transmission, or the fifth indication information is used to indicate that a serving cell of the terminal device supports establishment of the RRC connection in anonymous mode.

All related content of the steps in the foregoing method embodiments may be cited in function descriptions of corresponding functional modules, and details are not described herein again.

In this embodiment, the access network device 60 is presented in a form of functional modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the access network device 60 may be in a form of the access network device 20 shown in FIG. 2.

For example, the processor 201 in the access network device 20 in FIG. 2 may invoke the computer-executable instructions stored in the memory 202, so that the access network device 20 performs the methods in the foregoing method embodiments.

Specifically, the processor 201 in the access network device 20 shown in FIG. 2 may invoke the computer-executable instructions stored in the memory 202, to implement functions/implementation processes of the processing module 601 and the transceiver module 602 in FIG. 6. Alternatively, the processor 201 in the access network device 20 shown in FIG. 2 may invoke the computer-executable instructions stored in the memory 202, to implement functions/implementation processes of the processing module 601 in FIG. 6, and the transceiver 203 in the access network device 20 shown in FIG. 2 may implement functions/implementation processes of the transceiver module 602 in FIG. 6.

Because the access network device 60 provided in this embodiment may perform the foregoing data transmission method, for a technical effect that can be achieved by the access network device 60, refer to the foregoing method embodiments. Details are not described herein again.

Figure 7:
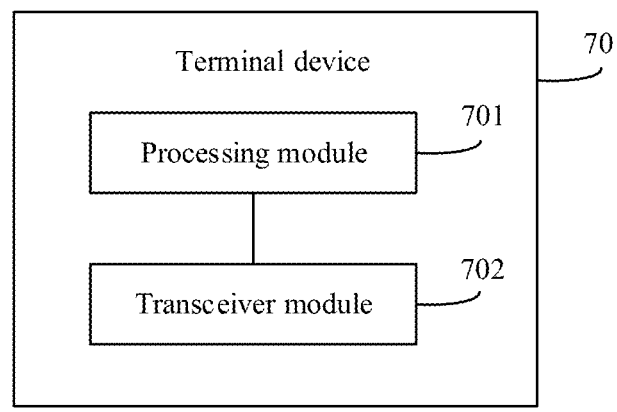
FIG. 7 is another schematic structural diagram of a terminal device according to an embodiment of this application.

Alternatively, for example, the communications apparatus is the terminal device in the foregoing method embodiments. FIG. 7 is a schematic structural diagram of a terminal device 70. The terminal device 70 includes a processing module 701 and a transceiver module 702. The transceiver module 702 may also be referred to as a transceiver unit, and is configured to implement a sending and/or receiving function, for example, may be a transceiver circuit, a transceiver, a transceiver, or a communications interface.

The processing module 701 is configured to determine to establish an RRC connection in anonymous mode. The transceiver module 702 is configured to send a first message to an access network device, where the first message is used to indicate the terminal device 70 to request to establish the RRC connection in anonymous mode.

In a possible implementation, the first message carries first indication information, where the first indication information is used to indicate the terminal device 70 to request to establish the RRC connection in anonymous mode.

In another possible implementation, the first message is a dedicated message used to indicate the terminal device 70 to request to establish the RRC connection in anonymous mode.

In still another possible implementation, the first message is an RRC setup complete message. The RRC setup complete message does not carry a NAS PDU information element, or the RRC setup complete message carries a NAS PDU information element whose length is 0.

In still another possible implementation, that the terminal device 70 sends the first message to the access network device includes: The terminal device 70 sends, on a first random access resource, the first message to the access network device, where the first random access resource is a dedicated resource used for random access for the RRC connection that the terminal device 70 requests to establish in anonymous mode.

Optionally, the transceiver module 702 is further configured to receive second indication information from the access network device, where the second indication information is used to indicate configuration information of the dedicated resource used for the random access for the RRC connection that the terminal device 70 requests to establish in anonymous mode, the configuration information is any combination of random access preamble information, random access time domain resource information, and random access frequency domain resource information, and the configuration information includes configuration information of the first random access resource.

Optionally, the transceiver module 702 is further configured to send a second message to the access network device, where the second message carries anonymous data. For example, the second message may be an RRC message.

Optionally, the second message further carries third indication information, where the third indication information is used to indicate that data transmission is completed or that the last anonymous data packet is currently transmitted.

Optionally, the transceiver module 702 is further configured to receive a third message from the access network device, where the third message is used to indicate to establish a data bearer DRB. The processing module 701 is further configured to establish the DRB based on the third message. The transceiver module 702 is further configured to send, on the DRB, the anonymous data to the access network device.

Optionally, the transceiver module 702 is further configured to send, on the DRB, fourth indication information to the access network device, where the fourth indication information is used to indicate that data transmission is completed or that the anonymous data is the last packet of anonymous data.

Optionally, the transceiver module 702 is further configured to send a fourth message to the access network device, where the fourth message is used to indicate that data transmission is completed or that the anonymous data is the last packet of anonymous data, or the fourth message is used to request to release the RRC connection corresponding to the terminal device 70.

Optionally, the transceiver module 702 is further configured to receive fifth indication information from the access network device, where the fifth indication information is used to indicate that a serving cell of the terminal device 70 supports anonymous data transmission, or the fifth indication information is used to indicate that a serving cell of the terminal device 70 supports establishment of the RRC connection in anonymous mode. Correspondingly, that the processing module 701 is configured to determine to establish an RRC connection in anonymous mode, the processing module 701 is specifically configured to: determine, based on the fifth indication information, to establish the RRC connection in anonymous mode.

All related content of the steps in the foregoing method embodiments may be cited in function descriptions of corresponding functional modules, and details are not described herein again.

In this embodiment, the terminal device 70 is presented in a form of functional modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the terminal device 70 may be in a form of the terminal device 30 shown in FIG. 2.

For example, the processor 301 in the terminal device 30 in FIG. 2 may invoke the computer-executable instructions stored in the memory 302, so that the terminal device 30) performs the methods in the foregoing method embodiments.

Specifically, the processor 301 in the terminal device 30 shown in FIG. 2 may invoke the computer-executable instructions stored in the memory 302, to implement functions/implementation processes of the processing module 701 and the transceiver module 702 in FIG. 7. Alternatively, the processor 301 in the terminal device 30 shown in FIG. 2 may invoke the computer-executable instructions stored in the memory 302, to implement functions/implementation processes of the processing module 701 in FIG. 7, and the transceiver 303 in the terminal device 30 shown in FIG. 2 may implement functions/implementation processes of the transceiver module 702 in FIG. 7.

Because the terminal device 70 provided in this embodiment may perform the foregoing data transmission method, for a technical effect that can be achieved by the terminal device 70, refer to the foregoing method embodiments. Details are not described herein again.

Optionally, an embodiment of this application further provides a communications apparatus (for example, the communications apparatus may be a chip or a chip system).

The communications apparatus includes a processor, configured to implement the method in any one of the foregoing method embodiments. In a possible design, the communications apparatus further includes a memory. The memory is configured to store necessary program instructions and necessary data. The processor may invoke the program code stored in the memory, to instruct the communications apparatus to perform the method in any one of the foregoing method embodiments. Certainly, the communications apparatus may not include a memory. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the apparatuses described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method performed by an access network device, wherein the method comprises:
   receiving a first message from a terminal device, wherein the first message is used to indicate that the terminal device requests to establish a radio resource control (RRC) connection in an anonymous mode wherein data is transmitted anonymously, and the first message carries a value determined by the terminal device but does not carry a terminal identifier of a non-access stratum nor a part of a field of the terminal identifier;
   determining, based on the first message, that the terminal device requests to establish the RRC connection in the anonymous mode; and
   establishing the RRC connection in the anonymous mode to the terminal device.

2. The method according to claim 1, wherein establishing the RRC connection in the anonymous mode to the terminal device does not comprise:
   establishing a connection for the terminal device to a core network device.

3. The method according to claim 1, wherein the first message carries first indication information used to indicate that the terminal device requests to establish the RRC connection in the anonymous mode.

4. The method according to claim 1, wherein the first message is an RRC setup complete message; and
   determining, based on the first message, that the terminal device requests to establish the RRC connection in the anonymous mode comprises:
   determining that the RRC setup complete message does not carry a Non Access Stratum Packet Data Unit (NAS PDU) information element or that the RRC setup complete message carries a NAS PDU information element whose length is 0.

5. The method according to claim 1, wherein receiving the first message from the terminal device comprises: receiving, on a first random access resource, the first message from the terminal device, wherein the first random access resource is a dedicated resource used for random access for the RRC connection.

6. The method according to claim 1, wherein after determining that the terminal device requests to establish the RRC connection in the anonymous mode, the method further comprises:
   receiving from the terminal device a second message carrying anonymous data.

7. The method according to claim 6, wherein the second message further carries third indication information used to indicate that data transmission is completed or that the anonymous data is a last packet of anonymous data; and the method further comprises:
   releasing the RRC connection corresponding to the terminal device based on the third indication information.

8. The method according to claim 1, wherein after determining that the terminal device requests to establish the RRC connection in the anonymous mode, the method further comprises:
   sending to the terminal device a third message used to indicate to establish a data bearer (DRB); and receiving, from the DRB, anonymous data from the terminal device.

9. The method according to claim 8, further comprising:
receiving, from the DRB, fourth indication information from the terminal device, wherein the fourth indication information is used to indicate that data transmission is completed or that the anonymous data is a last packet of anonymous data; and
releasing the RRC connection corresponding to the terminal device based on the fourth indication information.

10. A communication method performed by a terminal device, wherein the method comprises:
determining to establish a radio resource control (RRC) connection in an anonymous mode wherein data is transmitted anonymously; and
sending to an access network device a first message used to indicate a terminal device requests to establish the RRC connection in the anonymous mode, wherein the first message carries a value determined by the terminal device but does not carry a terminal identifier of a non-access stratum nor a part of a field of the terminal identifier.

11. The method according to claim 10, wherein the first message carries first indication information used to indicate the terminal device requests to establish the RRC connection in the anonymous mode.

12. The method according to claim 10, wherein the first message is an RRC setup complete message, and the RRC setup complete message does not carry a Non Access Stratum Packet Data Unit (NAS PDU) information element, or the RRC setup complete message carries a NAS PDU information element whose length is 0.

13. The method according to claim 10, wherein sending the first message to the access network device comprises:
sending, on a first random access resource, the first message to the access network device, wherein the first random access resource is a dedicated resource used for random access for the RRC connection.

14. The method according to claim 13, wherein before sending the first message to the access network device, the method further comprises:
receiving second indication information from the access network device, wherein the second indication information is used to indicate configuration information of the dedicated resource used for the random access for the RRC connection, the configuration information is any combination of random access preamble information, random access time domain resource information, and random access frequency domain resource information, and the configuration information comprises configuration information of the first random access resource.

15. The method according to claim 10, wherein after sending the first message to the access network device, the method further comprises:
sending to the access network device a second message that carries anonymous data.

16. The method according to claim 15, wherein the second message further carries third indication information used to indicate that data transmission is completed or that a last anonymous data packet is currently transmitted.

17. The method according to claim 10, wherein after sending the first message to the access network device, the method further comprises:
receiving from the access network device a third message used to indicate to establish a data bearer (DRB);
establishing the DRB based on the third message; and
sending, on the DRB, anonymous data to the access network device.

18. The method according to claim 17, wherein the method further comprises:
sending, on the DRB, fourth indication information to the access network device, wherein the fourth indication information is used to indicate that data transmission is completed or that the anonymous data is a last packet of anonymous data.

19. The method according to claim 15, wherein the anonymous data comprises minimization of drive tests data.

20. A communications apparatus, wherein the communications apparatus comprises:
a processor and a transceiver, wherein
the processor is configured to determine to establish a radio resource control RRC connection in an anonymous mode wherein data is transmitted anonymously; and
the transceiver is configured to send a first message to an access network device, wherein the first message is used to indicate a terminal device to request to establish the RRC connection in the anonymous mode, wherein the first message carries a value determined by the terminal device but does not carry a terminal identifier of a non-access stratum nor a part of a field of the terminal identifier.

* * * * *